(12) United States Patent
Peel et al.

(10) Patent No.: US 11,852,963 B2
(45) Date of Patent: Dec. 26, 2023

(54) SYSTEMS AND METHODS FOR CONTROLLING A PLUMBING FIXTURE, SMART MIRROR, AND THE LIKE USING PROJECTED IMAGES

(71) Applicants: Kohler Co., Kohler, WI (US); Kohler Mira Ltd., Cheltenham (GB)

(72) Inventors: Kevin Peel, Gloucester (GB); Craig Fitton, Cheltenham (GB); Nigel Sansum, Gloucester (GB); Chanseol Chung, Milwaukee, WI (US)

(73) Assignee: Kohler Co., Kohler, WI (US)

(*) Notice: Subject to any disclaimer, the term of this patent is extended or adjusted under 35 U.S.C. 154(b) by 170 days.

(21) Appl. No.: 17/237,713

(22) Filed: Apr. 22, 2021

(65) Prior Publication Data
US 2021/0333699 A1    Oct. 28, 2021

Related U.S. Application Data
(60) Provisional application No. 63/015,019, filed on Apr. 24, 2020.

(51) Int. Cl.
| | | |
|---|---|---|
| *G02B 30/56* | (2020.01) | |
| *A47G 1/02* | (2006.01) | |
| *G03B 21/20* | (2006.01) | |
| *H05B 47/115* | (2020.01) | |
| *G06F 3/01* | (2006.01) | |

(52) U.S. Cl.
CPC .......... *G03B 21/2053* (2013.01); *G06F 3/017* (2013.01); *H05B 47/115* (2020.01)

(58) Field of Classification Search
CPC .......... G02B 30/56; G02B 30/60; A47G 1/02; G06F 3/017
See application file for complete search history.

(56) References Cited

U.S. PATENT DOCUMENTS

| | | | |
|---|---|---|---|
| 2018/0046363 A1* | 2/2018 | Miller | G06F 3/012 |
| 2019/0285904 A1 | 9/2019 | Kim et al. | |
| 2020/0336705 A1* | 10/2020 | Mouizina | H04N 7/18 |
| 2020/0409507 A1* | 12/2020 | Nakai | G02B 30/56 |

FOREIGN PATENT DOCUMENTS

| | | |
|---|---|---|
| CN | 108091123 | 5/2018 |
| JP | 2014-160183 A | 9/2014 |

OTHER PUBLICATIONS

Extended European Search Report on EP Appl. Ser. No. 21170170.1 dated Oct. 7, 2021 (9 pages).
English Summary of China Office Action corresponding to CN 202110452314.5, dated May 5, 2022.
EP Examination Report corresponding to EP 21170170.1 dated Nov. 24, 2022.
Office Action and English Translation corresponding to CN 2023072702828980, dated Jul. 27, 2023.

* cited by examiner

*Primary Examiner* — Ryan D Howard
(74) *Attorney, Agent, or Firm* — Patterson Thuente, P.A.

(57) ABSTRACT

At least one embodiment relates to a mirror assembly. The mirror assembly includes an interior portion and a wall. The wall includes an exterior reflective surface. At least a portion of the wall can allow light to pass from the interior portion through the wall. The mirror assembly includes a light source and a lens located within the interior portion. The lens can be arranged to receive light from the light source and to direct such light through the portion of the wall so as to project an image beyond the exterior reflective surface.

21 Claims, 29 Drawing Sheets

FIG. 36
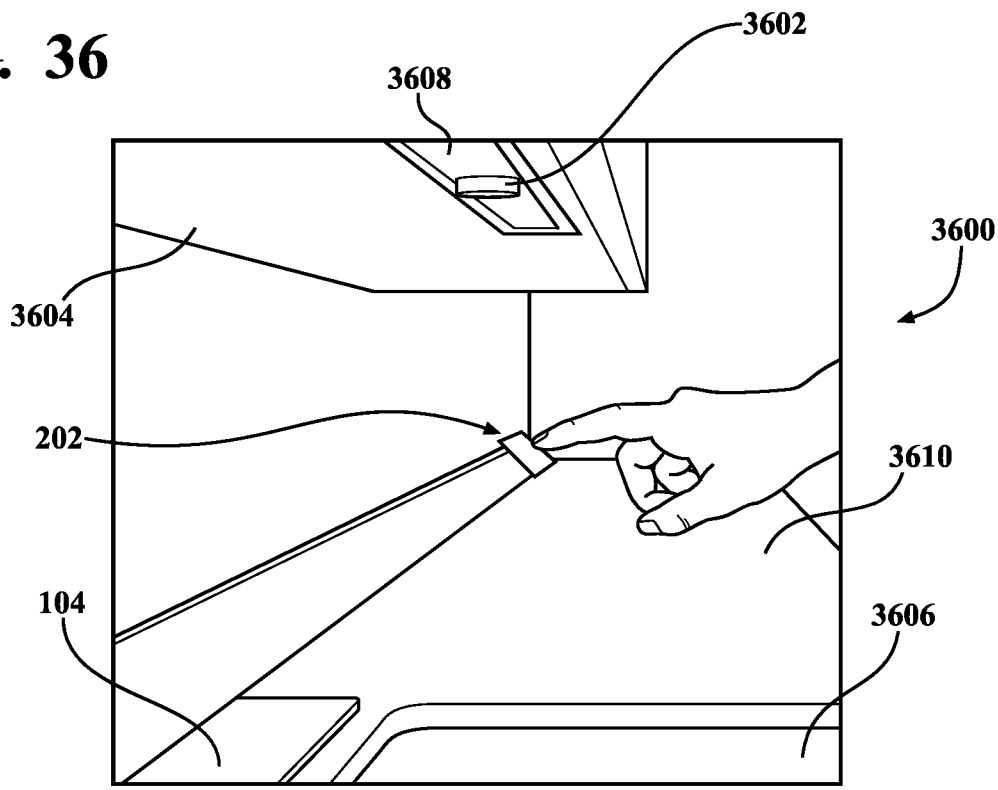
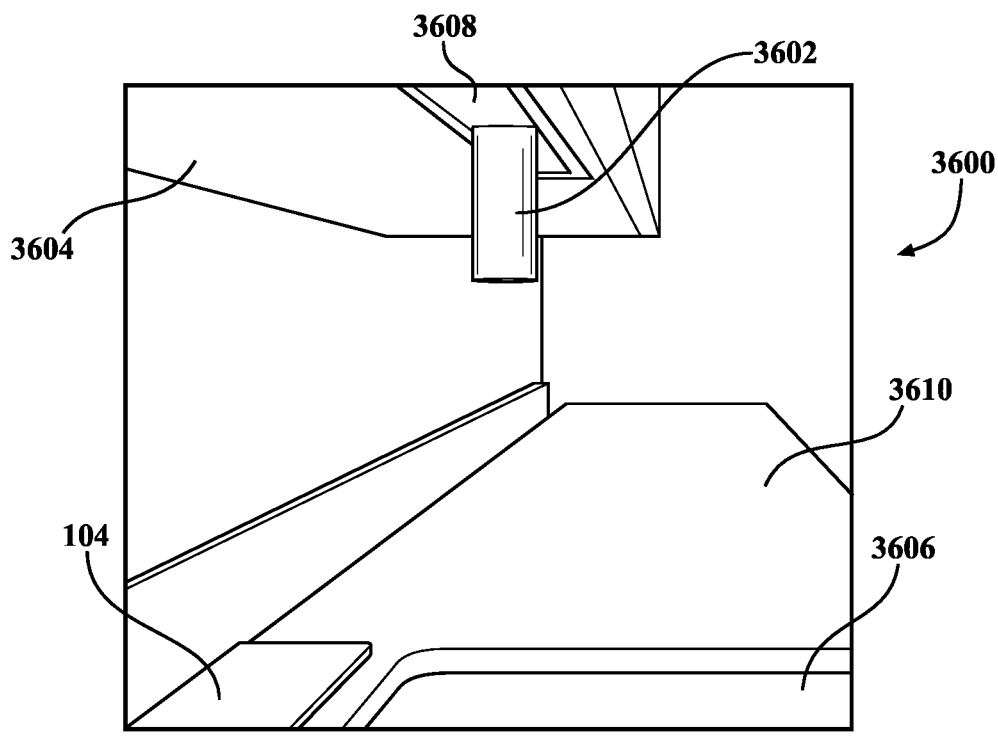
FIG. 37

SYSTEMS AND METHODS FOR CONTROLLING A PLUMBING FIXTURE, SMART MIRROR, AND THE LIKE USING PROJECTED IMAGES

CROSS-REFERENCE TO RELATED PATENT APPLICATIONS

This application claims the benefit of and priority to U.S. Provisional Application No. 63/015,019, filed on Apr. 24, 2020, the entire disclosure of which is hereby incorporated by reference herein.

BACKGROUND

The present disclosure relates generally to plumbing fixtures (e.g., faucets, toilets, etc.), smart mirrors, and related products that may be found in a kitchen or bathroom environment. More specifically, the present disclosure relates to systems and methods for controlling various devices in a household, industrial, or other environment using images that are projected in space (sometimes referred to as "holograms" or "holographic displays," and which may display two- or three-dimensional images in space that are viewable by a user).

Plumbing fixtures for use in commercial and residential spaces are typically controlled using conventional manual inputs, such as handles, knobs, and the like. For example, a user may operate a faucet by manipulating one or more knobs or handles to control the flow rate and temperature of the water flow from the faucet. In another example, a user may actuate a toilet flush cycle using a trip lever coupled thereto.

Recognizing that there may be situations where it is desirable to allow actuation of a plumbing fixture without the need for a user to physically contact the plumbing fixture, some manufacturers have incorporated technology that allows for touchless actuation of such devices. For example, some faucets may utilize sensors (e.g., infrared, proximity sensors, etc.) for automatically turning on and off the faucet when a user's hand enters a sensing zone. Similar technology may be used in the context of toilets and urinals to operate a flush cycle without the need to physically contact a trip lever or other component of the toilet or urinal. Such touchless actuation systems may advantageously provide a more sanitary user experience and also allow the plumbing fixtures to remain cleaner over time (e.g., because user fingerprints will not smudge shiny metal faucet handles, etc.).

In some cases, it may not be clear to a user how to use a touchless actuation system, causing the user to instead manually operate the plumbing component. For example, it may not be immediately clear to a user where the sensing zone for the plumbing component is. Such touchless actuation systems may also have a limited feature set (e.g., simply allowing a faucet to turn on or off, but not adjusting temperature, etc.).

It would be advantageous to provide an improved system that addresses one or more of the aforementioned issues.

SUMMARY

At least one embodiment relates to a mirror assembly. The mirror assembly includes an interior portion and a wall. The wall includes an exterior reflective surface. At least a portion of the wall can allow light to pass from the interior portion through the wall. The mirror assembly includes a light source and a lens located within the interior portion. The lens can be arranged to receive light from the light source and to direct such light through the portion of the wall so as to project an image beyond the exterior reflective surface.

At least one embodiment relates to a mirror assembly. The mirror assembly includes an interior portion and a wall. The wall includes an exterior reflective surface. At least a portion of the wall can allow light to pass from the interior portion through the wall. The mirror assembly includes a light source and a lens located within the interior portion. The lens can be arranged to receive light from the light source and to direct such light through the portion of the wall so as to project an image beyond the exterior reflective surface. The mirror assembly includes one or more external lights located along the wall adjacent the exterior reflective surface. The mirror assembly includes a controller communicably coupled to the one or more external lights. The controller can generate one or more control signals for controlling the one or more external lights based on a user interaction with the projected image.

At least one embodiment relates to a system. The system includes a mirror assembly. The mirror assembly includes an interior portion and a wall. The wall includes an exterior reflective surface. At least a portion of the wall can allow light to pass from the interior portion through the wall. The mirror assembly includes a light source and a lens located within the interior portion. The lens can be arranged to receive light from the light source and to direct such light through the portion of the wall so as to project an image beyond the exterior reflective surface. The mirror assembly includes one or more external lights located along the wall adjacent the exterior reflective surface. The mirror assembly includes a controller communicably coupled to the one or more external lights. The controller can generate one or more control signals for controlling the one or more external lights based on a user interaction with the projected image.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 36 through FIG. 38 show views of a kitchen environment in which a position of a retractable faucet may be controlled via the projection system of FIG. 1, according to illustrative embodiments.

DETAILED DESCRIPTION

Figure 1:
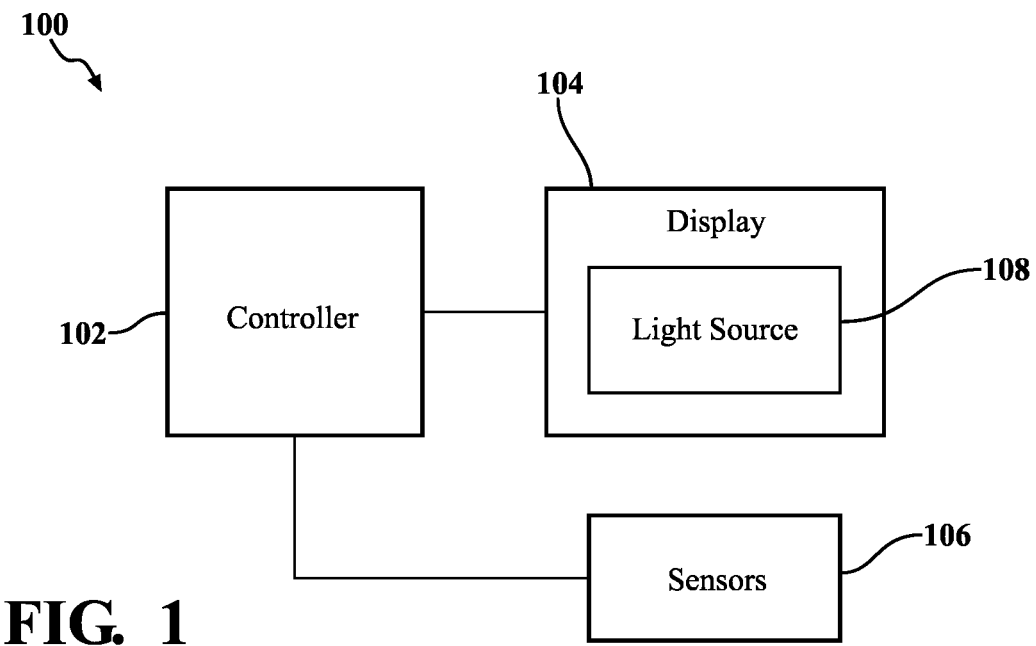
FIG. 1 shows a schematic diagram of a projection system, according to an illustrative embodiment.

Referring generally to the FIGURES, systems and methods for controlling a device (such as a plumbing fixture, smart mirror, or other kitchen or bathroom product) may include components that allow for the projection of an image in space that is viewable by a user. Such projected images may be referred to herein as "holograms," and may be two-dimensional or three-dimensional in nature. The term "projected images" as used herein is intended to encompass 2D projected images, 3D projected images, holograms or holographic images, and the like.

According to an exemplary embodiment, the system may include a display that is configured to project an image. The projected image may be viewable by a user located near the display. The system may also include one or more sensors arranged or configured to detect gestures (generally referred to as user inputs) provided by the user to the projected image. For example, a user may "touch" a location in the projected image, and the movement by the user to "touch" the location may be detected by a sensor (e.g., an IR sensor, a proximity sensor, etc.) to provide the user with a sense of being able to manipulate or control features of the projected image such as a projected button, switch, toggle, or the like.

The system may generate a control signal for various devices located near the display. For example, the system may generate control signals for a plumbing fixture according to the detected gestures from a user. As various non-limiting examples, the user may interact with a projected image of a bar to adjust a temperature or water flow rate from a faucet or shower, the user may interact with a projected image of an icon to commence (or cease) water flow from a faucet or showerhead, the user may interact with projected images of various buttons to flush a toilet or flush a toilet with longer or shorter flush sequences, and so forth.

The systems and methods described herein may provide an intuitive way for controlling plumbing fixtures or other devices. Rather than physically manipulating manual input devices for controlling the plumbing fixtures, a user may provide gestures and inputs via the projected images for controlling the plumbing fixtures. The systems and methods described herein may provide a clean and germ-free manner for plumbing fixture control by providing controls without having to physically touch any hardware components. Additionally, rather than memorizing predetermined gestures, the systems and methods described herein may generate and project images that are intuitive. Accordingly, the user experience and user friendliness may be improved as compared to other gesture-controlled systems. Various other improvements and advantages of the present disclosure are described in greater detail below.

It is noted that the systems and methods described herein may be used for controlling plumbing fixtures or other household devices or appliances. For example, the systems and methods described herein may be used for controlling lighting in a household (e.g., interior or exterior lighting), smart mirrors, etc. The systems and methods described herein may be used to provide video and/or pictures to a user. For example, the systems and methods described herein may be used for rendering or projecting a floating recipe or video instructions (e.g., in a kitchen environment), images over a sink in hospitals (e.g., handwashing instructions), prompts or images for radio or other controls, alerts (such as when a thermal disinfection is running), etc. Various examples of such embodiments are described below.

The accompanying figures illustrate certain exemplary embodiments in detail, although it should be understood that the present disclosure is not limited to the details or methodology set forth in the description or illustrated in the figures. It should also be understood that the terminology used herein is for the purpose of description only and should not be regarded as limiting.

Figure 2:
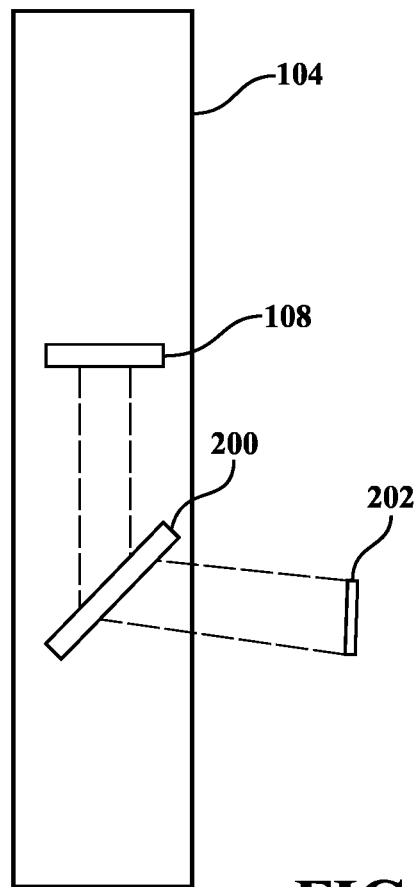
FIG. 2 shows a display that incorporates the projection system of FIG. 1, according to an illustrative embodiment.

Turning now to the accompanying drawings, FIGS. 1 and 2 show a schematic view of a projection system 100 and a view of a display 104 incorporating a projection system such as the projection system 100 of FIG. 1. The projection system 100 may be used for controlling various devices or components in a residential, industrial, commercial, or other environment. For example, the projection system 100 may be used for controlling a plumbing fixture, lights, a smart mirror, and so forth.

The projection system 100 is shown to include a controller 102 communicably coupled to a display 104 and one or more sensors 106. The projection system 100 may be incorporated into and used to control one or more devices. In some embodiments, the controller 102 may be internal to the device in which the projection system 100 is used to control. For example, the controller 102 may be incorporated into a computing system for a smart mirror, a smart faucet or shower, and the like. The controller 102 may be incorporated or a component of an application-specific integrated circuit (ASIC) for the device. In some embodiments, the controller 102 may be external to and communicably coupled (e.g., via various application programming interfaces (APIs)) to the devices in which the projection system 100 is used to control. The controller 102 may be configured to generate control signals for a device based on a user's gestures to a projected image.

In some embodiments, the sensors 106 may be arranged within the display 104, while in other embodiments, the sensors 106 may be external to the display 104. As shown in FIG. 2, the display 104 includes a light source 108, which may include a plurality of light emitting diodes (LED), a liquid crystal display, an LED or organic LED display, etc. The light source 108 is configured to project light towards a lens 200 (or screen). In some embodiments, the lens 200 may be internal to the display 104. In some embodiments, the lens 200 may be located at a distance from the light source 108. For example, the lens 200 may be positioned along a work surface in a kitchen or bathroom environment (e.g., adjacent a sink). The lens 200 may be designed to project an image 202 from the display 104 which corresponds to the light from the light source 108. The projected image 202, also referred to as a hologram or holographic image, may be projected towards a user (not shown). The sensors 106 may be arranged to detect gestures (also referred to as user inputs) that are directed to or "interact with" the projected image 202. The sensors 106 may transmit data corresponding to the gestures to the controller 102. The controller 102 may be configured to parse the data from the sensors 106 to control connected devices (e.g., valves for a plumbing fixture, lights in a smart mirror, nearby or remote lighting, and/or other components in a residential, industrial, commercial, or other environment). Various examples and further details are described in greater detail below.

In some embodiments, some components of the display 104 may be separated from other components of the display 104. For example, some components of the display 104 (such as the light source 108) may be located in a kitchen cupboard, and other components of the display 104 (such as the lens 200) may be located in or along a work surface in the kitchen. In some embodiments, the display 104 may be arranged or incorporated in a wall, ceiling, cupboard, etc. adjacent to a device to be controlled. For example, the light source 108 and display 104 may be arranged in a cupboard arranged above a sink and configured to project an image 202 downwardly towards the sink such that the image 202 is viewable by a user at the sink. As another example, the light source 108 and display 104 may be embedded or otherwise incorporated in a wall adjacent a shower space and configured to project an image 202 laterally towards the shower space such that the image 202 is viewable by a user approaching or entering the shower space. Accordingly, the display 104 may be configured to project images 202 in any direction such that the images 202 are viewable by a user located at, near, or approaching a device to be controlled.

Figure 4:
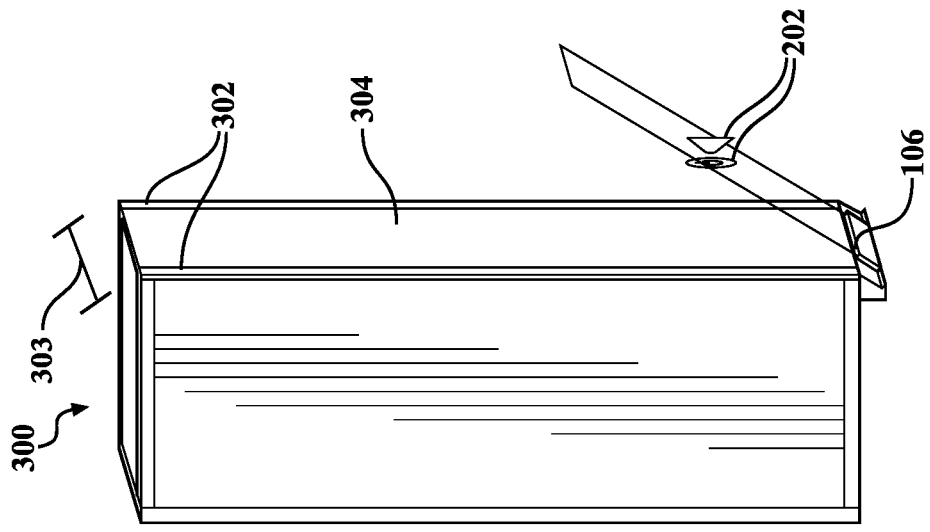
FIG. 4 shows a perspective view of the smart mirror of FIG. 3, according to an illustrative embodiment.
Figure 3:
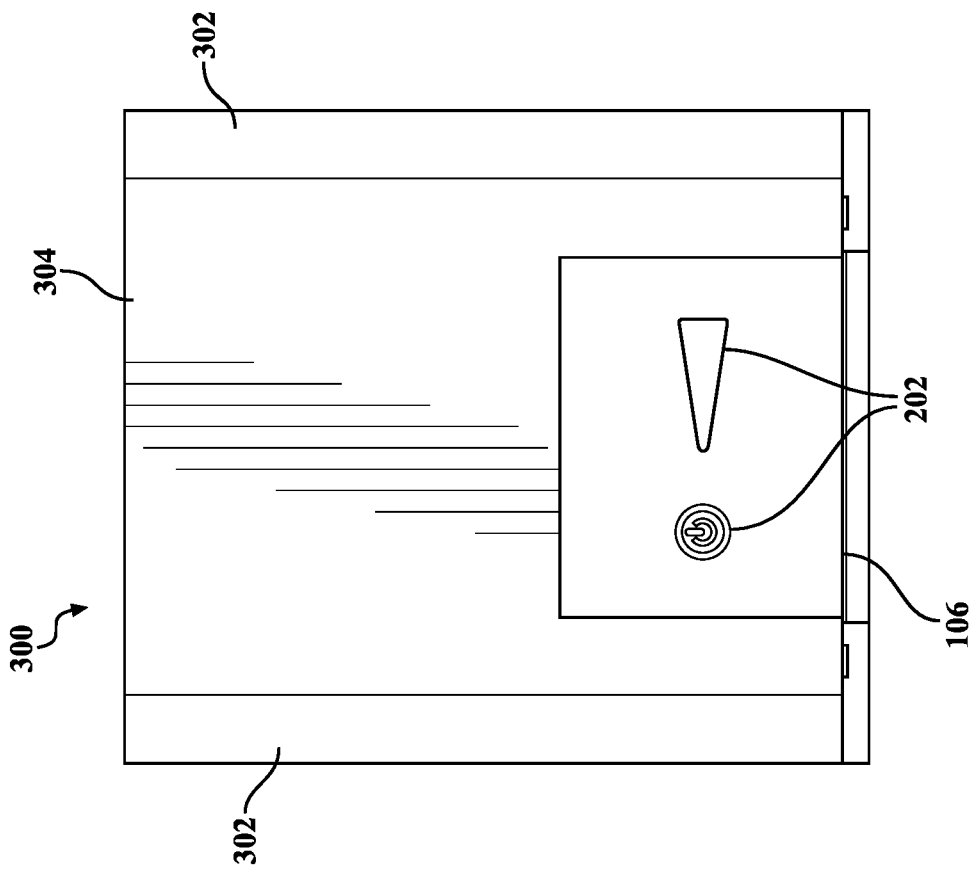
FIG. 3 shows a front view of a smart mirror including the projection system of FIG. 1, according to an illustrative embodiment.
Figure 5:
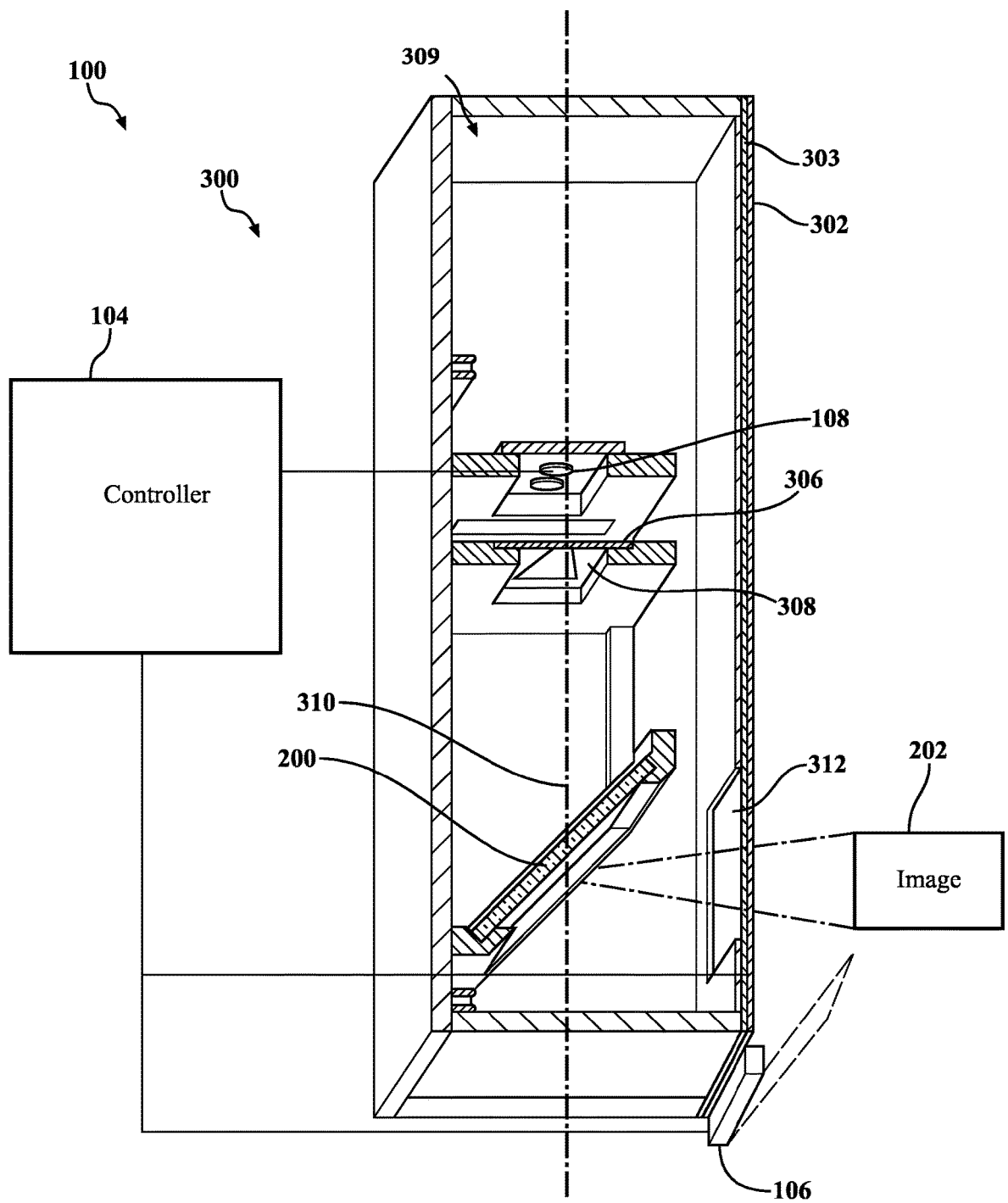
FIG. 5 shows an internal view of the smart mirror of FIG. 3, according to an illustrative embodiment.
Figure 6:
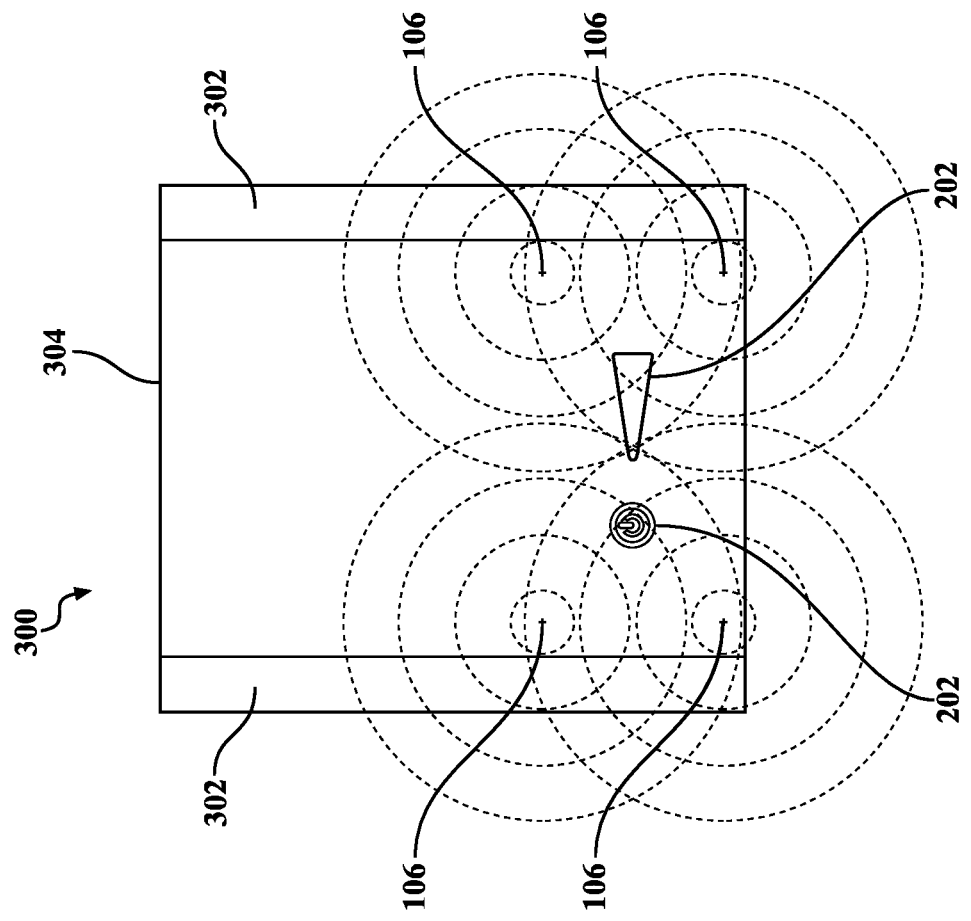
FIG. 6 shows a front view of a smart mirror including the projection system of FIG. 1, according to another illustrative embodiment.

FIGS. 3-8 depict front, perspective, and internal views of a smart mirror 300 (also referred to herein as a mirror assembly), according to illustrative embodiments. The system 100 may be incorporated into and utilized to control various components of a smart mirror 300, according to illustrative embodiments. In the embodiments shown in FIGS. 3-5, the sensors 106 are embedded in a sensor bar along a bottom portion of the smart mirror 300, whereas in the embodiments shown in FIGS. 6-8, the sensors 106 are embedded in the smart mirror 300. The smart mirror 300 may include side lights 302 which are arranged adjacent a mirrored portion 304 of the smart mirror 300 along a user-facing wall 303 of the smart mirror 300. As such, the user-facing wall 303 may include both the mirrored portion 304 and the side lights 302. The user-facing wall 303 may define a housing including an interior portion 309, which may include, support, or otherwise house various components or devices as described herein. The side lights 302 may be dimmable, for example. As best shown in FIG. 3 and FIG. 6, the display 104 may be configured to project images 202 through the mirrored portion 304 for controlling various components of the smart mirror 300, such as the side lights 302 of the smart mirror 300. For example, the display 104 may be configured to project an image 202 of an on/off symbol for turning the side lights 302 on and off, and the display 104 may be configured to project an image of a triangle-shaped slider bar for dimming the side lights 302. The display 104 may be configured to project further images 202 which correspond to notifications rendered for the smart mirror 300 (e.g., new email or messages, weather, time, etc.). Some of the projected images 202 of the smart mirror 300 may be interactive. For example, a user at the smart mirror 300 may use a finger in space to "press" the projected image 202 of the on/off symbol to turn on the side lights 302, and may adjust a brightness or dimness of the side lights 302 by sliding or "swiping" their finger along the projected image 202 of the triangle-shaped slider bar.

Figure 7:
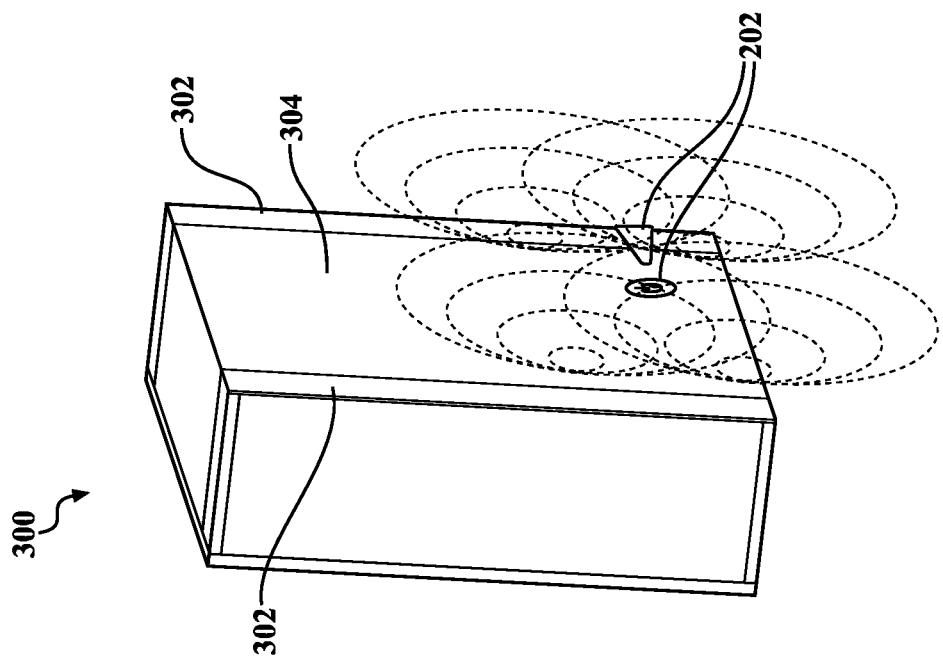
FIG. 7 shows a perspective view of the smart mirror of FIG. 6, according to an illustrative embodiment.

The sensors 106 may be configured to detect the inputs for the user to the projected images 202, and to generate control signals for the side lights 302 based on the detected inputs from the user. As best shown in FIGS. 4 and 7, the sensors 106 may be configured to sense a space adjacent the smart mirror 300 which intersects, includes, or otherwise corresponds to the projected image. In the embodiment shown in FIG. 4, the sensors 106 may be configured to project a sensing plane (e.g., via infrared sensors, for instance) with intersects or otherwise includes the projected image. In the embodiment shown in FIG. 7, the sensors 106 may be configured to radially output sensing signals (e.g., via ultrasonic or "chirp" sensors) from apertures formed in the mirrored portion 304 of the smart mirror 300. The sensing signals may at least include a space which corresponds to the projected image 200. In some embodiments, further, additional, or alternative sensors 106 may be incorporated into the system 100. For example, the system 100 may use radar sensors, laser or light sensors, cameras (along with image processing software), and so forth.

Figure 8:
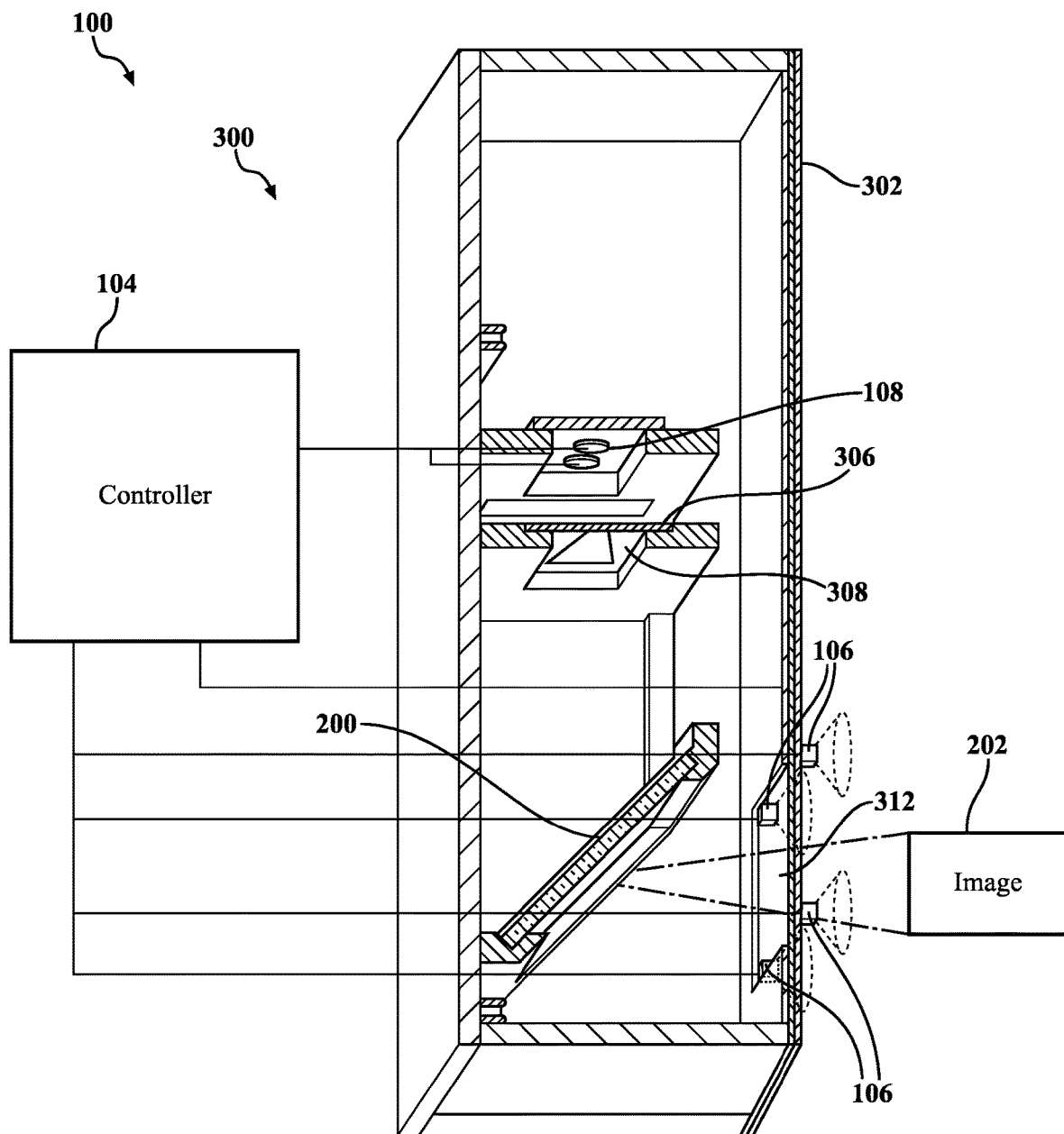
FIG. 8 shows an internal view of the smart mirror of FIG. 6, according to an illustrative embodiment.

As best shown in FIGS. 5 and 8, the smart mirror 300 may include the light source 108 (illustratively shown as LEDs mounted to or otherwise supported by a substrate). The light source 108 may be arranged to project light towards a plate 306 that includes a stencil 308, and into the lens 200. The lens 200 may generate a projected image 202 which corresponds to the stencil 308, as described in greater detail below. Where the light source 108 is a display (e.g., an LED or LCD display, for instance), the plate 306 and stencil 308 may be omitted.

In some embodiments, the interior portion 309 of the smart mirror 300 may be coated with a paint, resin, or other material designed or implemented to block, absorb, or otherwise inhibit reflection of light (e.g., a "blacked out" material) within the interior portion 309 of the smart mirror 300. The blacked out material in the interior portion 309 of the smart mirror 300 may prevent light from the light source 108 being visible to a user (e.g., thereby retaining the functionality of the mirrored portion 304 and reducing unwanted "ghost" images). The mirrored portion 304 of the smart mirror 300 may extend parallel (or substantially parallel) to a longitudinal axis 310 of the smart mirror 300. In some embodiments, the backside of the mirrored portion 304 may be partially coated with the blacked out material. In some embodiments, the mirrored portion 304 may be or include a two-way mirror. For example, the mirrored portion 304 may be arranged such that the reflective (e.g., mirrored) surface faces outwardly (e.g. perpendicular to the longitudinal axis 310 and away from the interior of the smart mirror 300) towards a user, whereas the non-reflective (e.g., transparent) surface faces inwardly (e.g., opposite the outwardly-facing surface) towards the internal components of the smart mirror 300. Accordingly, light from outside of the display 104 reflects off of the mirrored portion 304, whereas light inside of the display 104 (e.g., from the light source 108) passes through the mirrored portion 304. In some embodiments, light may pass through a portion 312 of the mirrored portion 304. In other words, a portion 312 of a backside of the mirrored portion 304 may be or include a two-way mirror, whereas another portion of the backside of the mirrored portion 304 may be coated with the blacked out material. For example, the mirrored portion 304 may include a portion 312 in which light from the light source 108 which is directed towards the lens 200 and is projected from the lens 200 passes through and is viewable by a user. Other internal facing portions of the mirrored portion 304 may be coated or painted with the blacked out material as described above. Such embodiments may provide for internal light from the light source 108 to pass through the portion 312 of the backside of the mirrored portion 304.

In some embodiments, the lens 200 may include an electrochromic display arranged on one or more sides of the lens 200. For example, the lens 200 may include an electrochromic display along a side of the lens 200 which faces the light source 108. As another example, the lens 200 may include an electrochromic display along a side of the lens 200 which is opposite the side of the lens 200 facing the light source 108. The electrochromic display may act as a protective cover for the lens 200 while selectively blocking, inhibiting, or preventing light from passing through the lens 200. The controller 102 may be configured to control the electrochromic display when the controller 102 controls the light source 108 of the display 104. When the light source 108 is inactive, off, or otherwise not directing light towards the lens 200, the controller 102 may not provide power to the electrochromic display, which causes the electrochromic display to be black (and thereby inhibit or prevent light from passing through the lens 200). When the controller 102 controls the light source 108 to direct light towards the lens 200, the controller 102 may be configured to generate a control signal for the electrochromic display (or displays) of the lens 200 to power the electrochromic displays, thereby allowing light to pass through the lens 200 to generate the projected image 202.

Figure 9:
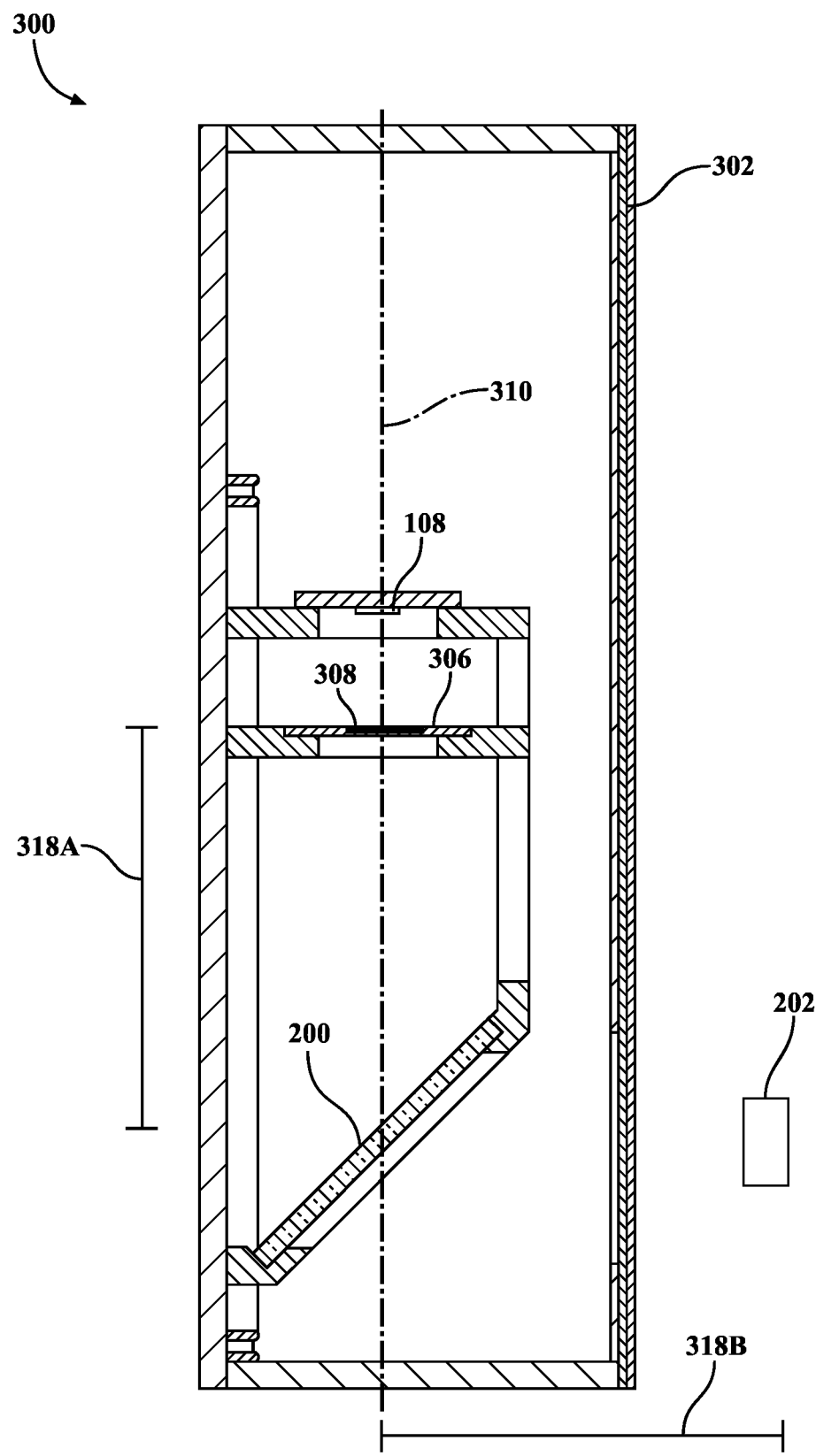
FIG. 9 shows a detailed view of the smart mirror of FIG. 3 or FIG. 6, according to an illustrative embodiment.

FIG. 9 shows a detailed internal view of the smart mirror 300. With reference to FIG. 2 and FIG. 9, the display 104 includes a light source 108 mounted, coupled, attached, or otherwise supported by a substrate of the display 104. The display 104 further includes the plate 306 supporting the substrate and the lens 200. The light source 108 is arranged to direct light downwardly within the smart mirror 300 (e.g., toward the stencil 308). The light source 108 is arranged to direct light along (or parallel) the longitudinal axis 310, and is communicably coupled to the controller 102 of FIG. 1. The controller 102 is configured to generate light control signals for the light source 108 to control light output from the light source 108. In some embodiments, the light source 108 may be or include a light array including a plurality of independently controllable LEDs. The controller 102 may be configured to control the light source 108 to independently turn on and off light from the LEDs, to independently change colors, etc. As described in greater detail below, the controller 102 may control the light source 108 to output light to generate a projected image 202 at a distance from the mirrored portion 304 of the smart mirror 300.

While this embodiment is described, it is noted that the smart mirror 300 may use other lights and light sources 108 according to other exemplary embodiments. For example, the light source 108 of the display 104 may include an internal display screen (e.g., an LED display screen, an organic LED display screen, a liquid crystal display (LCD) screen, etc.). The internal display screen may be configured to generate an image, video, moving picture, and the like, which is directed towards the lens 200. In such embodiments, the plate 306 and stencil 308 may be omitted from the display 104. Such embodiments may be configured to project changing images 202, videos, moving pictures, and so forth (rather than a static projected image 202 from a stencil).

Figure 10:
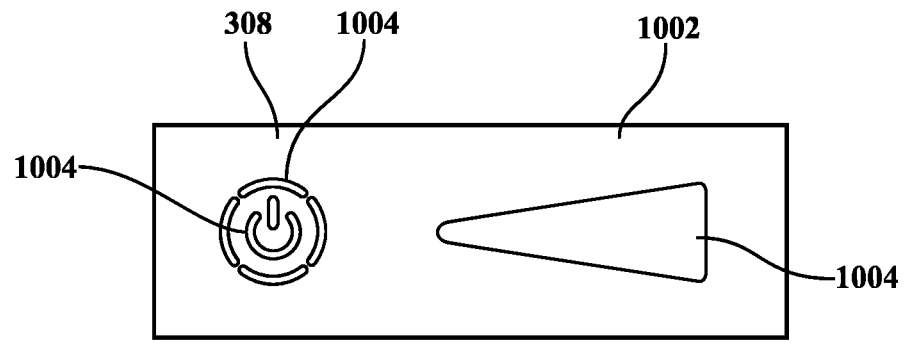
FIG. 10 shows a view of an example stencil which may be used in the smart mirror of FIG. 3 or FIG. 6, according to an illustrative embodiment.

The plate 306 may be arranged perpendicular to the longitudinal axis 310. In some embodiments, the plate 306 may be slanted relative to the longitudinal axis 310. The plate 306 may be slanted to allow the projected image 202 to appear to twist or rotate when projected. The plate 306 may be arranged intermediate the lens 200 and the light source 108. The plate 306 may be configured to hold, retain, suspend, or otherwise support the stencil 308. Referring briefly to FIG. 10, a view of an example stencil 308 is shown. The stencil 308 may include a light blocking portion 1002 and a light pass-through portion 1004. In some embodiments, the light blocking portion 1002 may be formed of or coated with a light-absorbent material, a blacked-out material, etc. The light pass-through portion 1004 may be formed of a transparent or translucent material. In some embodiments, the light pass-through portion 1004 may be a cut-out from the light blocking portion 1002. As such, light from the light source 108 which is directed towards the light blocking portion 1002 may not pass beyond the stencil 308, whereas light from the light source 108 which is directed towards the light pass-through portion 1004 may pass through the stencil 308 (e.g., towards the lens 200).

Figure 11:
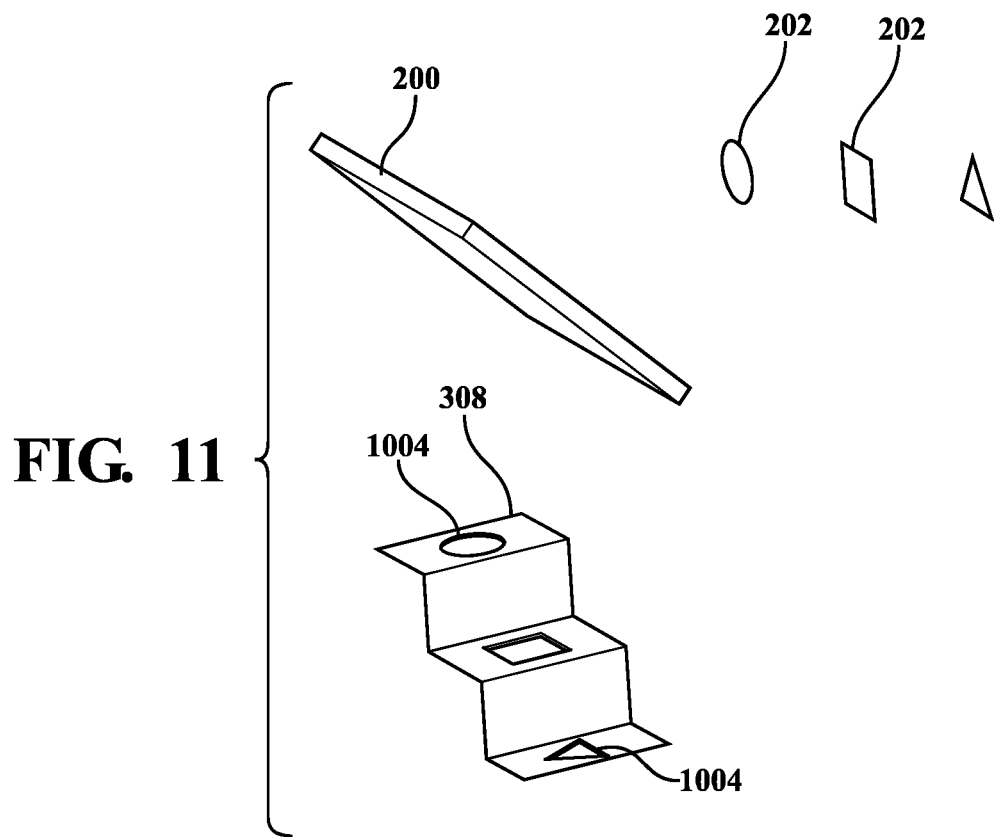
FIG. 11 shows a view of a staggered plate and stencil which may be used in the smart mirror of FIG. 3 or FIG. 6, according to an illustrative embodiment.
Figure 12:
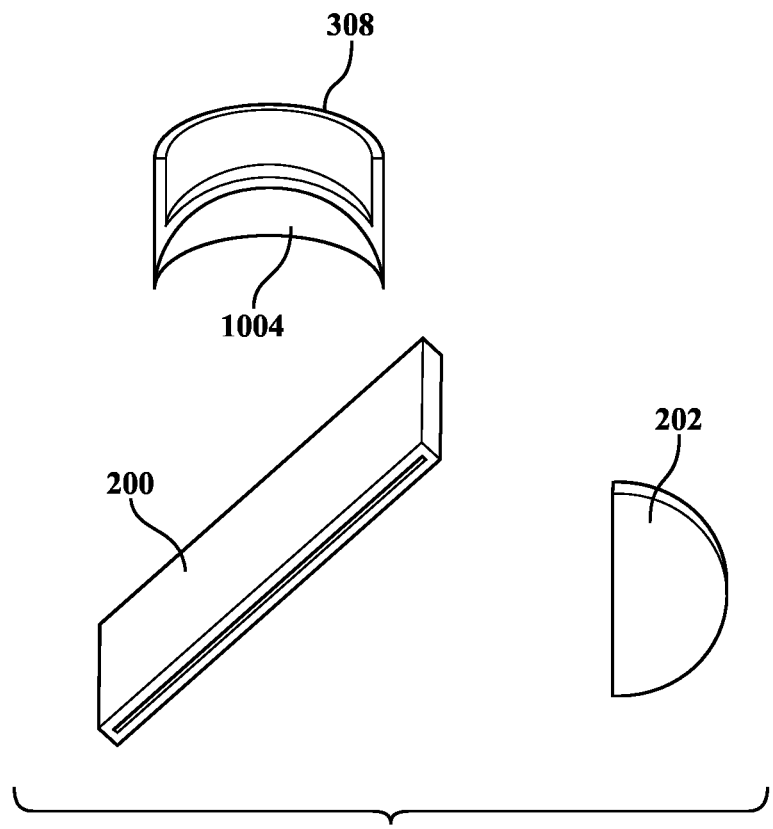
FIG. 12 shows a view of a curved plate and stencil which may be used in the smart mirror of FIG. 3 or FIG. 6, according to an illustrative embodiment.

In some embodiments, the plate 306 and/or stencil 308 may have various ridges such that the pass-through portions 1004 are located at different (e.g., staggered) distances from the light source 108 as shown in FIG. 11. For example, the light source 108 may be configured to direct light to pass through separate pass-through portions 1004 (e.g., a first pass-through portion 1004 arranged at the bottom surface of the stencil 308, a second pass-through portion 1004 arranged at a first distance from the bottom surface of the stencil 308, a third pass-through portion 1004 arranged at a second distance from the bottom surface of the stencil 308, etc.). By providing pass-through portions 1004 at different (e.g., staggered) distances, the display 104 may provide a 3D depth for the projected image 202, effectively generating a three-dimensional hologram. In some embodiments, the plate 306 and/or stencil 308 may be curved or otherwise have a surface contour as shown in FIG. 11. The plate 306 and/or stencil 308 may have a surface contour for projecting an image 202 having a 3D shape which corresponds to the surface contour. As shown in FIG. 11, the 3D shape for the projected image 202 may be inverse relative to the surface contour of the plate 306 and/or stencil 308. For example, where the plate 306 and/or stencil 308 are concave, the 3D shape of the projected image 202 may be convex.

The lens 200 may be arranged to extend at an angle relative to the longitudinal axis 310. In some embodiments, the lens 200 may extend at a substantially 45° angle relative to the longitudinal axis 310. While shown as a 45° angle relative to the longitudinal axis 310, it is noted that the lens 200 may be arranged at various angles depending on the desired perspective of the projected image 202 and anticipated viewing angle of a user located at the display 104 (as shown in FIGS. 15-18). The lens 200 may be arranged such that a top surface (e.g., which faces the plate 306) of the lens 200 is angled away from the surface of the smart mirror 300 opposite the mirrored portion 304.

The lens 200 may include micro-mirrors arranged in a matrix. Each of the micro-mirrors may include opposing light reflecting sides. The micro-mirrors may reflect light from the light source 108 two times to form a mirror image. The lens 200 may include a first assembly and a second assembly. The first assembly may include longitudinal (e.g., bar shaped, rectangular shaped, etc.) one-way mirrors with the light reflecting sides of the one-way mirrors being oriented in the same direction. The one-way mirrors may include a light absorbing side opposite the light reflecting side and a light absorbing side. Accordingly, as opposed to a two-way mirror, light directed towards the light absorbing side is absorbed rather than passing through the one-way mirror. Similarly, the second assembly may include longitudinal one-way mirrors with the light reflecting sides of the one-way mirrors being oriented in the same direction (and a light absorbing side on the opposite side of the one-way mirror). The first assembly may be stacked on top of the second assembly (e.g., the first assembly and second assembly may be laminated onto each other). The first assembly may be oriented relative to the second assembly such that the light reflecting sides of the first assembly intersects with the light reflecting surfaces of the second assembly. The light reflecting side of the first assembly may constitute the first light reflecting sides of the respective micro-mirrors, and the light reflecting sides of the second assembly constitute the second light reflecting sides of the respective micro-mirrors. In some embodiments, the lens 200 may be similar in some respects to the ASKA3D-Plate from Asukanet Company, Ltd., with headquarters located at 3-28-14 Gion, Asaminami-ku, Hiroshima-shi, Hiroshima, Japan 731-0138. While this embodiment is described, it is noted that other lenses or screens may be used in the display 104 to convert light from the light source 108 to a projected image 202 to a user. For example, the lens 200 may be a PARITY MIRROR from Parity Innovations Co., Ltd., with headquarters located at 1-4-1, ARAMOTOKITA, HIGASHIOSAKA, OSAKA, Japan 577-0011. As another example, the lens 200 may be a DCT-plate from EASpeed located at 204-A5 Embedded System Research Building, University of Science and Technology of China; No. 5089, Wangjiang West Road, Gaoxin District; Hefei, Anhui, China.

Figure 13:
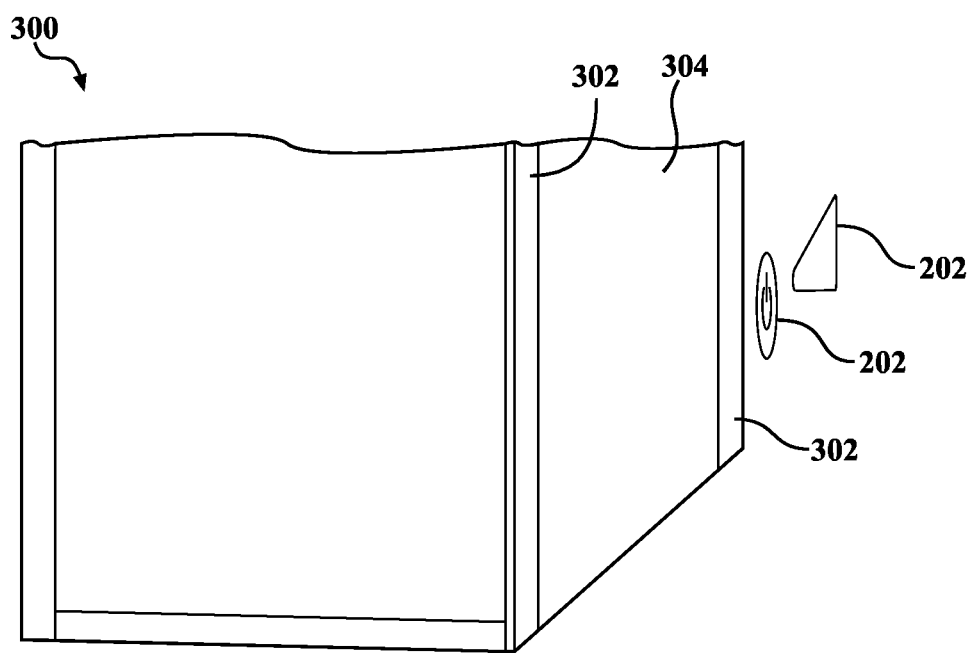
FIG. 13 shows a perspective view of a portion of the smart mirror of FIG. 3 or FIG. 6 projecting an image therefrom, according to an illustrative embodiment.

Referring to FIG. 13, depicted is a perspective view of a portion of the smart mirror 300 including the display 104 projecting an image 202 therefrom. As shown in FIGS. 10 and 13, the projected image 202 corresponds to the pass-through portion 1004 of the stencil 308 shown in FIG. 10. In operation, light from the light source 108 of the display 104 may be projected onto the light reflecting side of the first assembly (e.g., the top surface of the lens 200), and the light may be reflected within the matrix of micro-mirrors to produce a mirror image at a distance 318 from the light absorbing side of the second assembly (e.g., the bottom surface of the lens 200). The mirror image may be the projected image 202 in space (e.g., at the distance 318 from the light absorbing side of the second assembly). In some embodiments, the 3D image is projected at a distance 318B (e.g., a projection distance 318B) from the bottom surface of the lens 200, which is the same as the distance 318A (e.g., a light source distance 318A) between the top surface of the lens 200 and the stencil 308. Hence, the plate 306 with the stencil 308 may be positioned at a selected light source distance 318 from the top surface of the lens 200 to control the position of the image 202 projected by the display 104. As the lens 200 is positioned further away from the plate 306, the image 202 consequently is projected a further away from the lens 200. On the other hand, as the lens 200 is positioned closer to the plate 306, the image 202 consequently is projected closer to the lens 200. It is noted that the plate 306 should be positioned at a distance from the lens 200 such that the image 202 is positioned at least at some distance from the mirrored portion 304 of the smart mirror 300 (e.g., as shown in FIG. 13).

The sensors 106 may be arranged to detect user inputs to the controller 102 via the projected image 202. The sensor(s) 106 may include, for example, infrared sensors, ultrasonic sensors, etc., arranged to detect the user inputs. In the embodiments shown in FIGS. 3-5, the sensors 106 may be arranged in a sensor bar located along a bottom edge of the smart mirror 300. The sensors 106 may be configured to project a sensing plane which intersects the 3D image 202. Hence, the sensors 106 may be arranged within the sensor bar to project a sensing plane at an angle which corresponds to a distance in which the image 202 is projected from the mirrored portion 304 of the smart mirror 300. In the embodiments shown in FIGS. 6-8, the sensors 106 may be arranged within the display 104. For example, the mirrored portion 304 may include a plurality of apertures. The sensors 106 may be arranged to project sensing signals (for example, ultrasonic sensing signals) outwardly through the apertures. In these and other embodiments, the sensors 106 may be configured to detect user inputs to the controller 102 via the projected image 202.

A user may interact with the projected images 202 to provide inputs for the controller 102. For example, the user may push their finger "into" the projected image 202 of the on/off symbol as shown in FIGS. 3 and 6, the user may move their finger along the projected image 202 of the triangle-shaped slider bar, etc. to control the light output from the side lights 302. The sensors 106 may be configured to generate data corresponding to the user inputs. The sensors 106 may be configured to generate data corresponding to a first detected position of the user's hand (or finger) along with a path of the user's hand (or finger). The sensors 106 may be configured to transmit, send, or otherwise provide the data to the controller 102 for interpretation.

The controller 102 may be configured to parse the data from the sensors 106 to identify a corresponding user input. The controller 102 may be configured to generate light control signals for side lights 302 based on the detected user inputs. For example, where the user pushes their finger "into" the projected image 202 of the on/off symbol as shown in FIG. 3 and FIG. 6, the controller 102 may be configured to identify a user input to turn on (or turn off) the side lights 302 of the smart mirror 300. The controller 102 may be configured to generate control signals for controlling the side lights 302. In some embodiments, the controller 102 may be configured to generate light control signals for the light source 108 along with control signals for the side lights 302. For example, the controller 102 may first control the light source 108 to output light for projecting onto the portion of the stencil 308 corresponding to the on/off symbol. Once the controller 102 detects a user input corresponding to the on/off symbol, the controller 102 may be configured to generate a control signal for turning on the side lights 302 and controlling the light source 108 to project light onto both the portion of the stencil 308 corresponding to the on/off symbol and the portion of the stencil 308 corresponding to the triangle shape (e.g., for projecting additional images 202 to control the smart mirror 300). In some embodiments, the controller 102 may change the color of the light projected from the light source 108 (e.g., from a blue on/off symbol to turn on the side lights 302 to a red on/off symbol to turn off the side lights 302). It should be understood by those reviewing the present disclosure that the example provided of turning on/off lights and dimming lights in the smart mirror are only two functions, and that other functions may be controlled in other embodiments, and that the specifics of the projected image may vary according to still other embodiments. The examples shown herein should be taken as examples and not as limiting.

Figure 14:
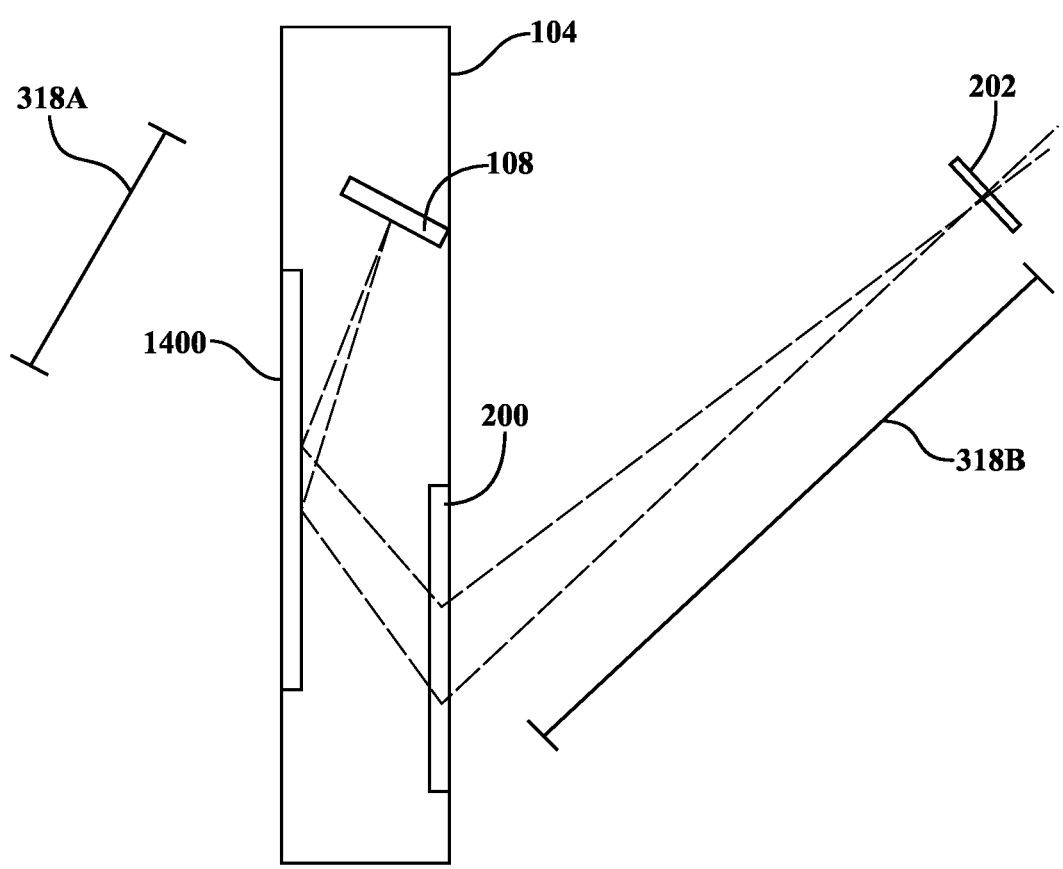
FIG. 14 shows an internal view of a display which may be incorporated into the system of FIG. 1, according to another illustrative embodiment.

In some embodiments, the display 104 may include one or more internal mirrors to increase a projection distance 318b relative to a light source distance 318A. For example, FIG. 14 depicts another embodiment of the display 104 is shown. The display 104 may include a mirror 1400 arranged intermediate the light source 108 and the lens 200. The mirror 1400 may be arranged to increase the total distance in which light from the light source 108 travels until reaching the lens 200, thereby increasing the projection distance 318B. By including the internal mirror 1400, the path of light from the light source may increase relative to the configuration shown in FIG. 2 where the light from the light source 108 has a direct path to the lens 200), thereby increasing the projection distance 318B relative to the light source distance 318A. Accordingly, the profile of the display 104 (and correspondingly, the components, appliances, etc. in which the display 104 is mounted) may be decreased while still projecting the image 202 at a distance from the mirrored portion 304 of the smart mirror 300.

In some embodiments, the controller 102 may be configured to adjust a position of one or more components of the display 104 for to change the perspective of the projected image 202 to compensate for different mounting heights of the display 104, to compensate for users of different heights, etc.

Figure 15:
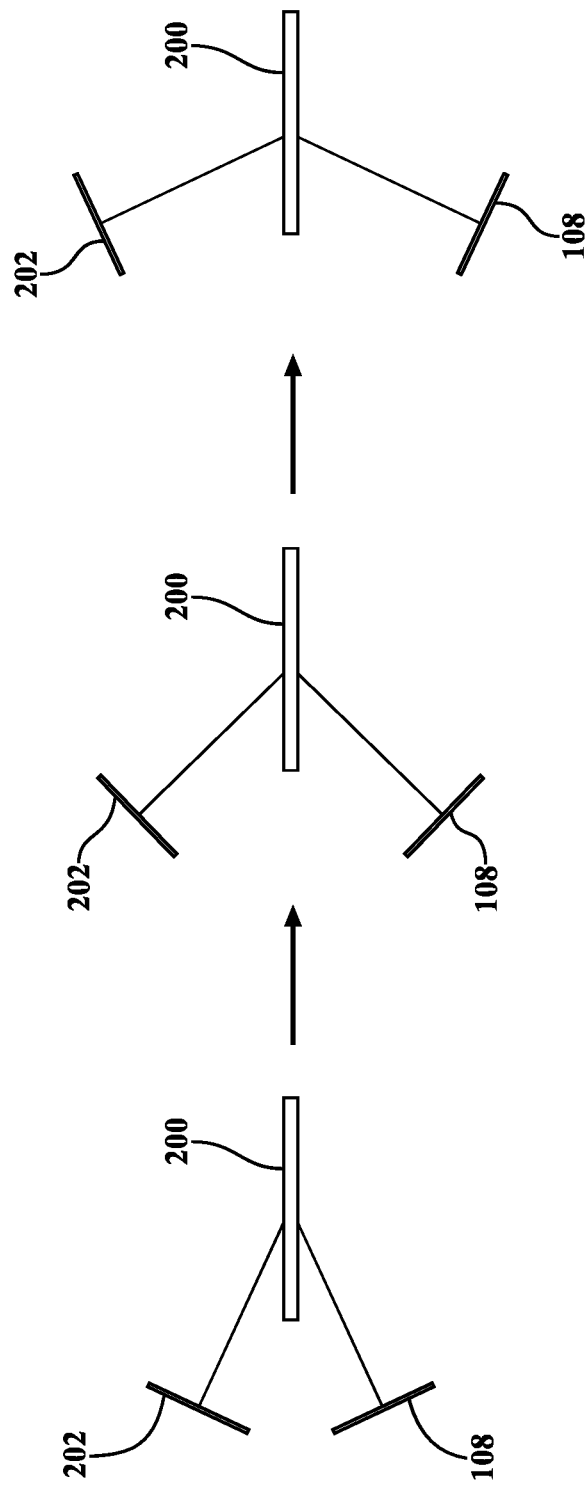
FIG. 15 shows a progression of movements of a light source relative to a screen of the display of FIG. 2 or FIG. 14 for modifying a perspective of the projected image, according to an illustrative embodiment.
Figure 16:
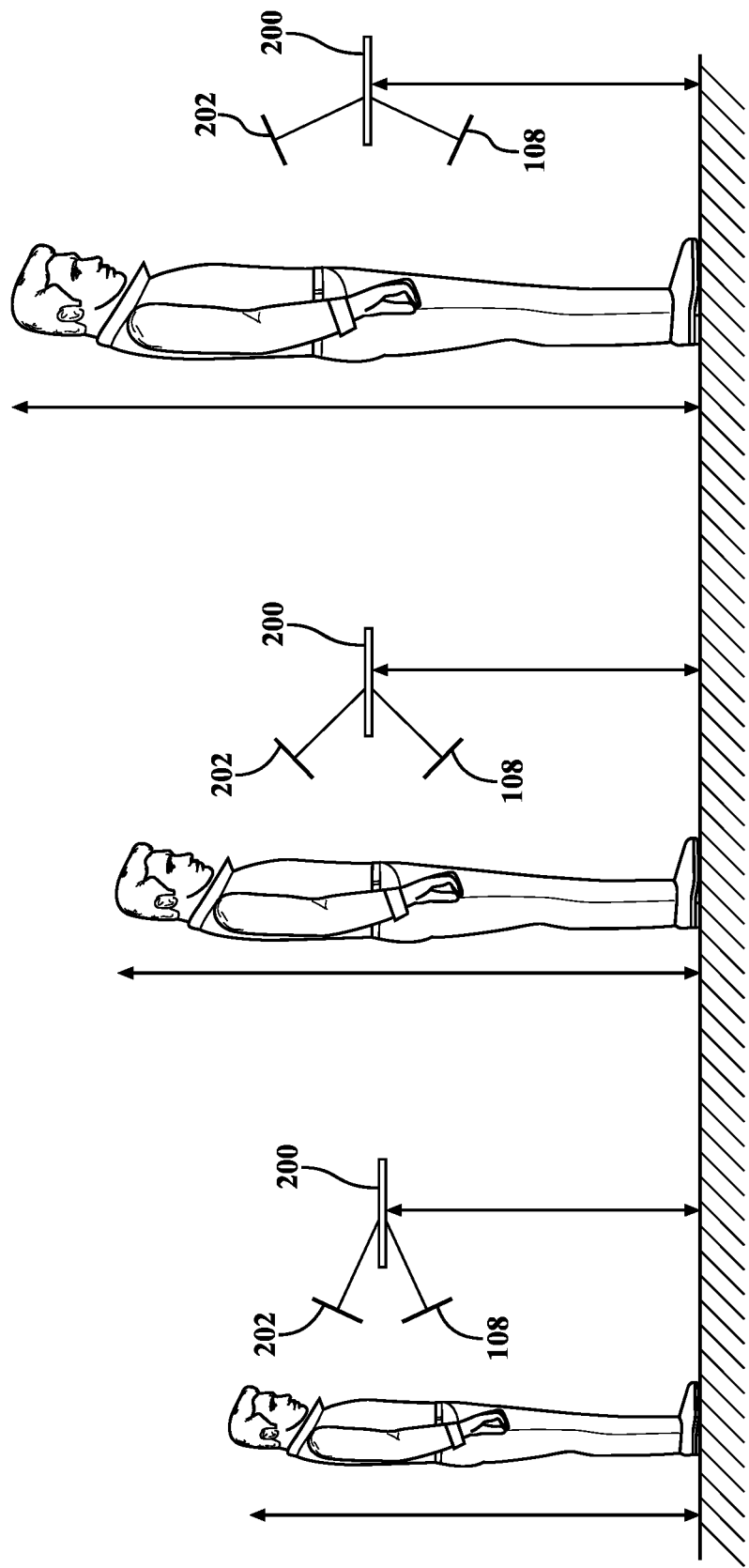
FIG. 16 shows a progression of movements for modifying a perspective of the projected image based on a height of a user, according to an illustrative embodiment.
Figure 17:
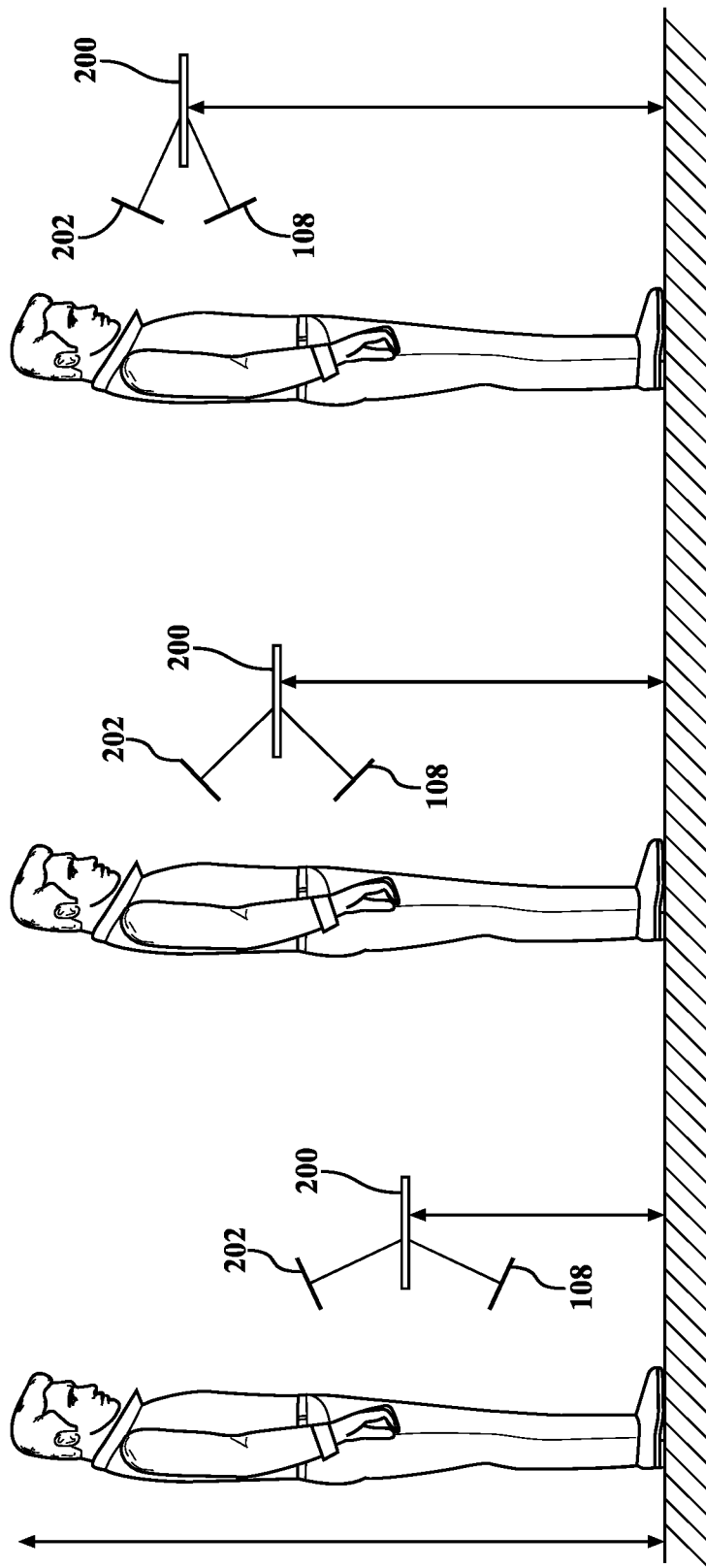
FIG. 17 shows a progression of movements for modifying a perspective of the projected image based on a position of the display relative to a user, according to an illustrative embodiment.
Figure 18:
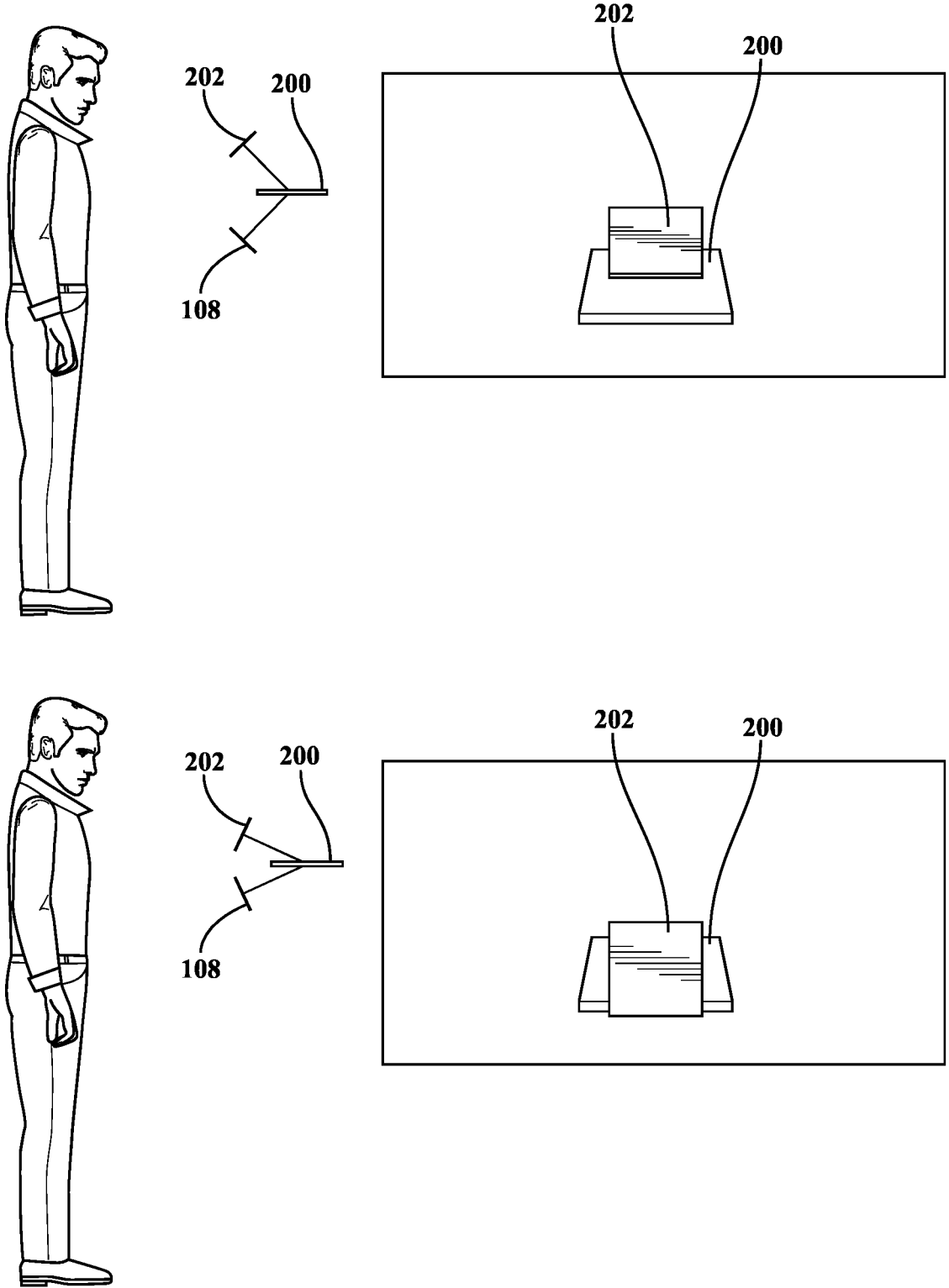
FIG. 18 shows a perspective of the projected image changing from a vantage point of a user, according to an illustrative embodiment.

Referring now to FIGS. 15-18, the controller 102 may be configured to modify a perspective of the projected image 202 by controlling a position of one or more components of the display 104. Specifically, FIG. 15 depicts an example of a progression of movements of the light source 108 relative to the lens 200 to modify a perspective of the projected image 202. FIG. 16 and FIG. 17 show various instances in which the controller 102 may modify the perspective of the projected image 202. FIG. 18 shows how the perspective of the projected image 202 changes from a vantage point of the user based on the movements from the controller 102. The controller 102 may be configured to modify the position of the display 104 (or one or more components of the display 104) based on data from the sensors 106. The sensors 106 may be configured to generate data corresponding to a height of a user located at or near the display 104 (e.g., at the smart mirror 300 or at another device or component in which the display 104 may be incorporated). The controller 102 may be configured to receive the data from the sensors 106. In some embodiments, the controller 102 may be configured to modify the perspective of the projected image 202 by generating motor control signals for motors connected to the light source 108 based on the data from the sensors 106. In some embodiments, the controller 102 may be configured to modify the perspective of the projected image 202 by generating motor control signals for motors connected to the lens 200 of the display 104. The controller 102 may be configured to access memory which stores a database or data structure of display 104 or component (e.g., light source 108, lens 200, etc.) positions and corresponding heights, sensor measurements, etc. The controller 102 may be configured to perform a look-up function using the detected height, the data from the sensors 106, etc. to identify a corresponding position for the display 104 or components thereof. The controller 102 may be configured to generate motor control signal(s) to modify the perspective of the projected image 202.

The controller 102 may be configured to determine, based on the data from the sensors 108, an estimated height of the user. As is best shown in FIG. 18, the controller 102 may modify the perspective of the projected image 202 such that the projected image 202 faces the user. The controller 102 may be configured to modify the perspective of the projected image 202 to optimize a viewing angle of the projected image 202 for the user. In some embodiments, the controller 102 may modify the perspective of the projected image 202 to compensate for users having different height (e.g., as shown in FIG. 16), to compensate for different mounting positions or locations (e.g., as shown in FIG. 17), and so forth. For example, the controller 102 may decrease the angle of the light source 108 relative to the lens 200 for providing a more upright viewing angle for a taller user and/or a lower mounting height. On the other hand, the controller 102 may increase the angle of the light source 108 relative to the lens 200 for providing a flatter viewing angle for a shorter user or higher mounting height.

The controller 102 may be configured to rotate, pivot, or otherwise modify the position of the display 104 (or one or more components of the display 104) to adjust the perspective of the projected image 202 for the user. In some embodiments, the controller 102 may be configured to rotate or pivot the substrate supporting the light source 108 to modify the perspective or viewing angle of the projected image 202. For example, the controller 102 may change the angle of the light source 108 relative to the lens 200 using a pivot located at the center of the substrate of the light source 108 coupled directly or indirectly to an electric motor (e.g., a servo motor, a stepper motor, actuator, solenoids, etc.). In some embodiments, the controller 102 may change the angle of the light source relative to the lens 200 by rotating the lens 200 relative to the light source 108 (e.g., the light source 108 is in a fixed position). In these and other embodiments, by rotating one or more components of the display 104, the controller 102 may be configured to modify a perspective of the projected image 202 as shown in FIG. 18. In some embodiments, the controller 102 may be configured to move the lens 200 and/or plate 306 to modify a distance between the light source 108 and lens 200 By changing the distance between the light source 108 and the lens 200, the projected image 202 may move closer and further away from the mirrored portion 304 of the smart mirror 300.

In some embodiments, the controller 102 may be configured to store user-specific settings in memory for the controller 102. Such user-specific settings may be or include default projection or perspective settings, default settings for a device (e.g., faucet, shower, bathtub, etc.) being controlled, and the like. The controller 102 may identify a particular user based on data from the sensors 106. For example, the sensors 106 may include camera(s). The controller 102 may be configured to process images from the camera(s) to perform facial recognition using the images. The controller 102 may be configured to generate a unique identifier for the user identified in images from the camera(s). The controller 102 may be configured to store settings for the user in association with the unique identifier corresponding to the user. For example, the controller 102 may be configured to generate settings corresponding to movements or settings for providing a user-specific viewing angle or perspective of a projected image 202. Similarly, the controller 102 may be configured to generate settings corresponding to user-specific water temperature, water flow rate, lighting, etc. for the user. The controller 102 may generate the settings based on previously-provided user inputs, an average or weighted average of previously-provided user inputs, etc. The controller 102 may be configured to store settings for the user in memory of the controller 102. Where the user is subsequently identified in images from the camera(s), the controller 102 may be configured to perform a look-up function using the unique identifier for the user to identify the corresponding user settings. Such systems and embodiments may provide optimized settings for the perspective and viewing angle of the image 202 associated with a particular user, along with optimized device settings which may be controlled by the user via interactions and gestures to the projected image 202.

Referring now to FIGS. 19-26, the system 100 depicted in FIG. 1 including the display 104 of FIG. 2 may be incorporated into a sink environment. Specifically, FIGS. 19-26 show various views of a work space 1900 that includes a countertop or sink deck 1901 (referred to herein as the "countertop 1901" for simplicity, it being understood that this portion may be incorporated into an integral countertop and basin product, into a portion of the sink itself, etc.), a sink 1902, and a faucet 1904. The display 104 may be included, formed, or otherwise positioned within or underneath the countertop 1901 adjacent the sink 1902 and faucet 1904. In some embodiments, the countertop 1901 may include a projection surface 2000. The projection surface 2000 may be flush or substantially flush with the countertop 1901 (as best shown in FIGS. 20-26). In some embodiments, the projection surface 2000 may be arranged along a backside of the work space 1900 (e.g., behind the sink 1902 and faucet 1904) as shown in FIGS. 36-46. In some embodiments, the projection surface 2000 may be mirrored, may be coated with a material to look metallic, may be coated or painted to substantially match the surface of the countertop 1901, etc. The underside of the projection surface 2000 may be light transmissive (e.g., such that light from the display 104 corresponding to the projected image 202 may pass through the projection surface 2000 to be viewable by a user).

In some embodiments, the controller 102 may be configured to control a plumbing fixture (e.g., a faucet, a bathtub, a toilet, etc.). The controller 102 may be communicably coupled to one or more valves (e.g., digital valves) corresponding to the plumbing fixture. For example, the controller 102 may be communicably coupled to a hot water valve corresponding to a hot water source and a cold water valve corresponding to a cold water source (or to a coupled mixing valve, as the case may be). The controller 102 may be configured to generate valve control signals corresponding to the plumbing fixture.

Figure 19:
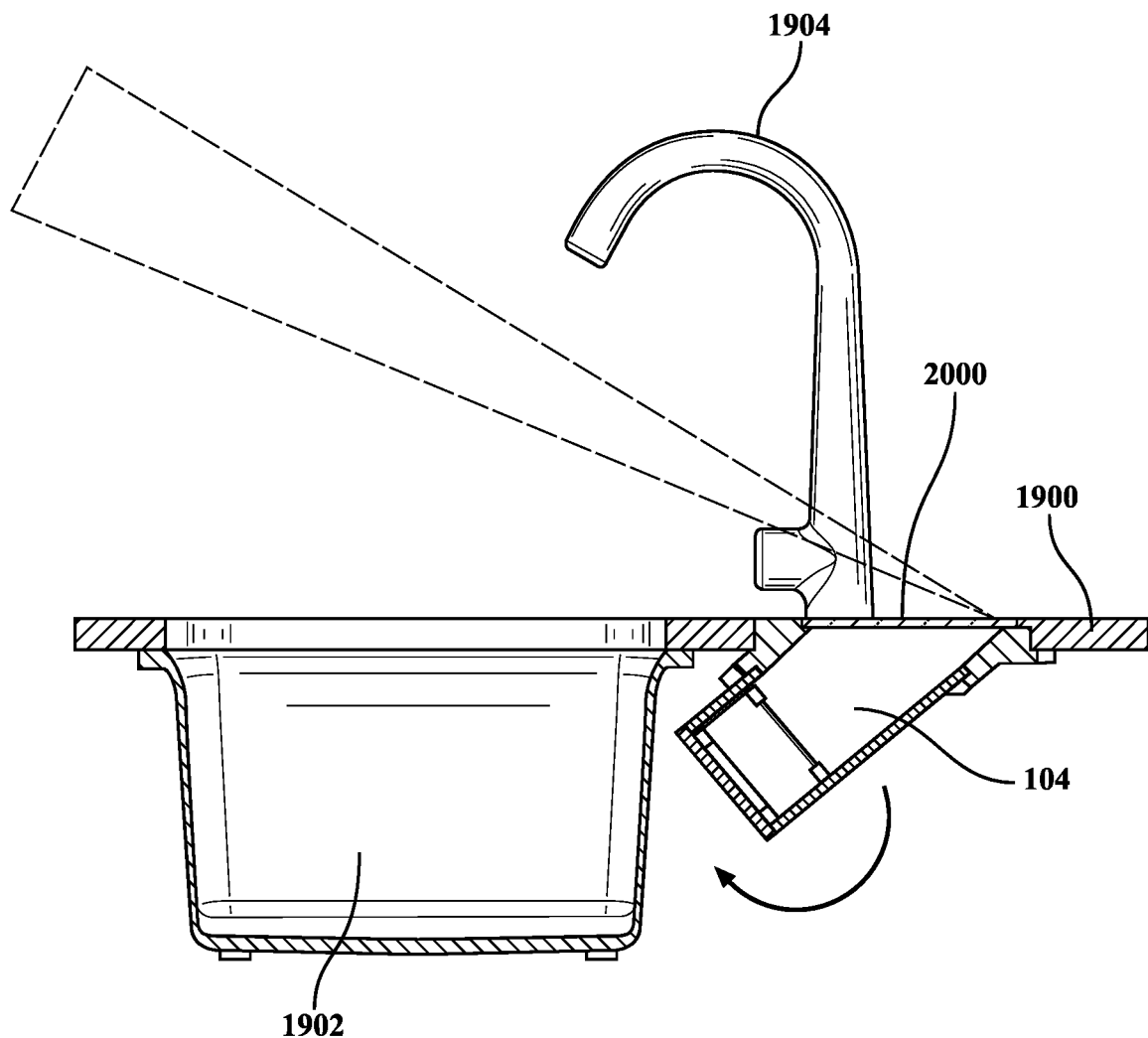
FIG. 19 shows a side view of a sink and faucet including the projection system of FIG. 1, according to an illustrative environment.
Figure 20:
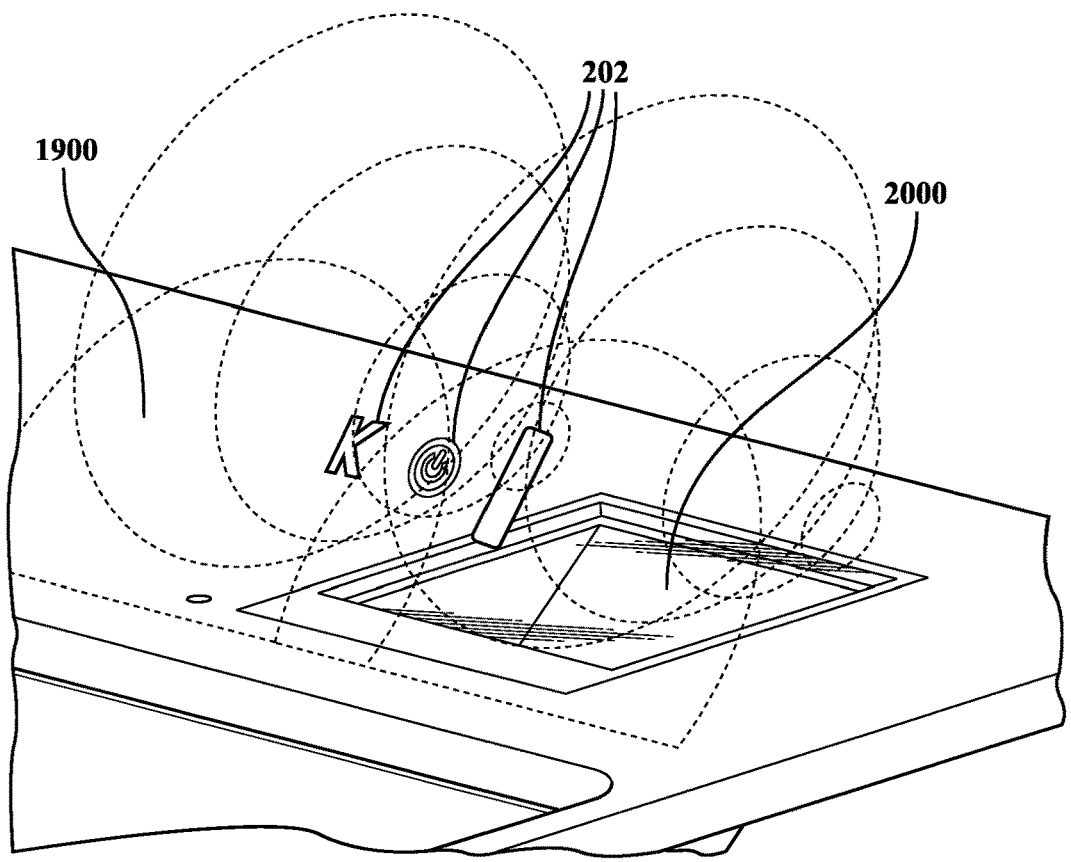
FIG. 20 shows a perspective view of a workstation adjacent the sink of FIG. 19, according to an illustrative environment.
Figure 21:
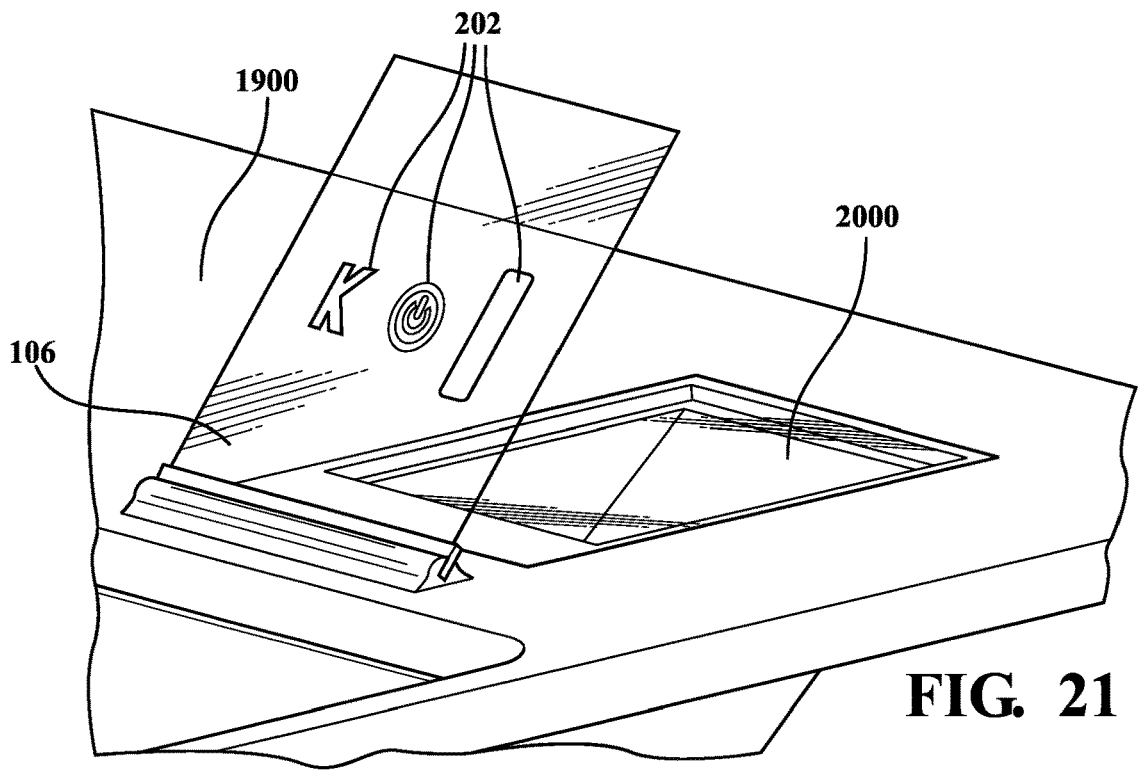
FIG. 21 shows a perspective view of a workstation adjacent the sink of FIG. 19, according to another illustrative environment.
Figure 22:
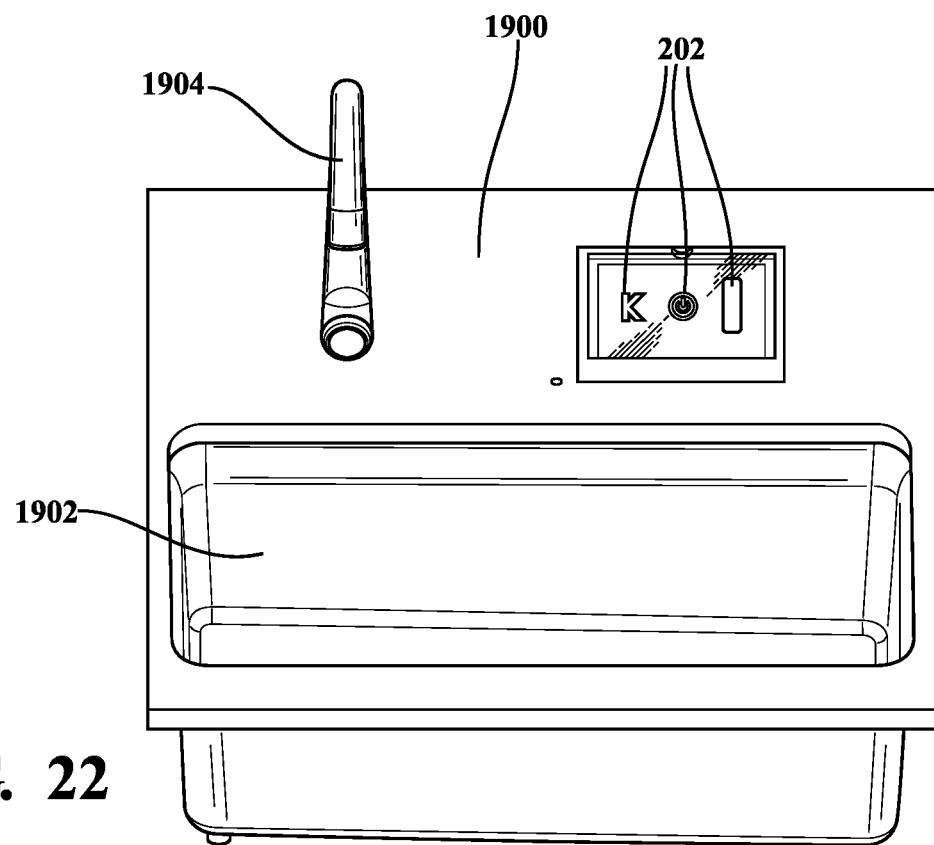
FIG. 22 shows a top-down view of the sink and faucet of FIG. 19, according to an illustrative embodiment.
Figure 23:
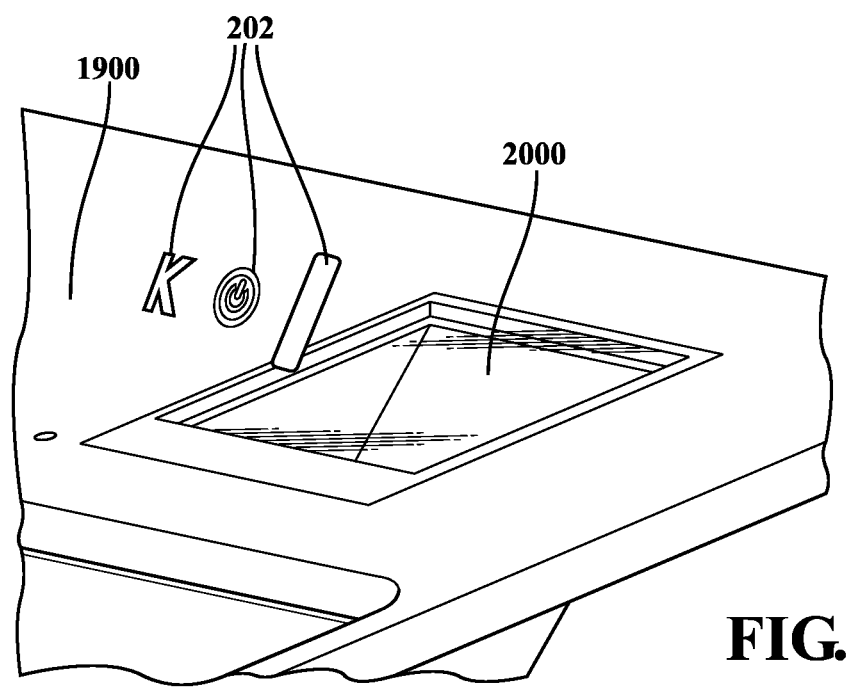
FIG. 23 shows a perspective view of the workstation of FIG. 20 or FIG. 21, according to an illustrative embodiment.
Figure 24:
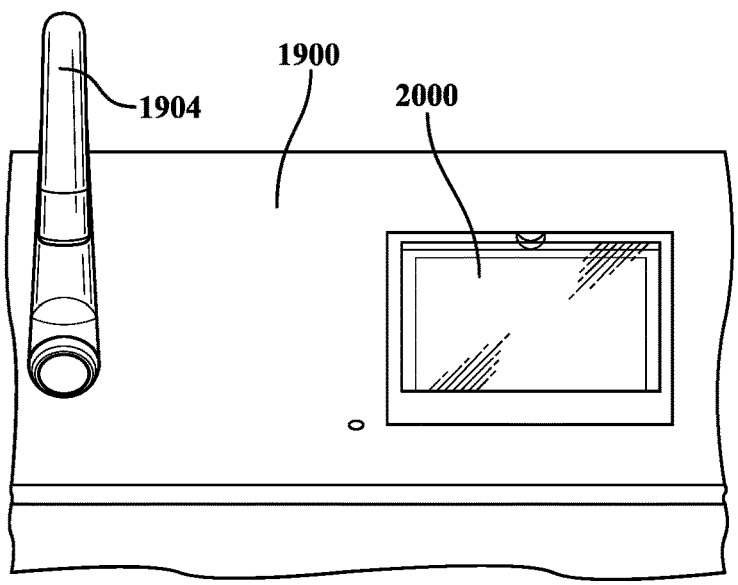
FIG. 24 through FIG. 26 show top-down views of the sink and faucet including a progression of selectively projecting images to a user, according to illustrative embodiments.
Figure 25:
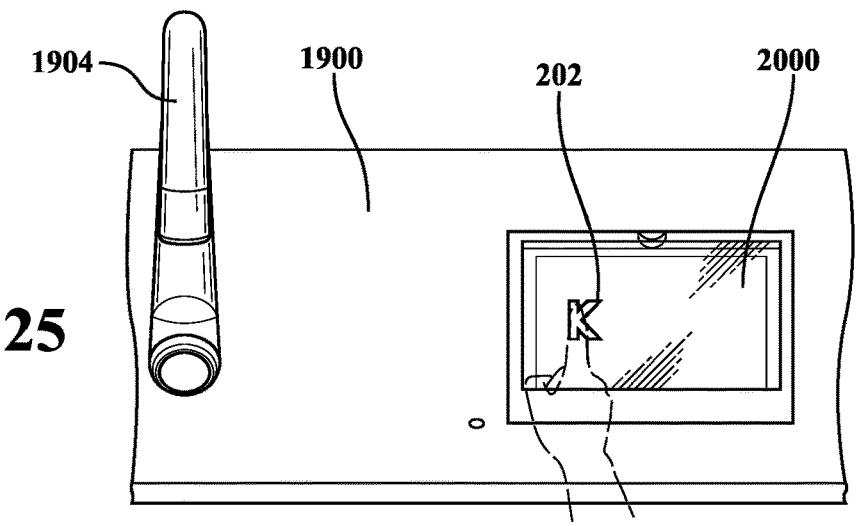
Figure 26:
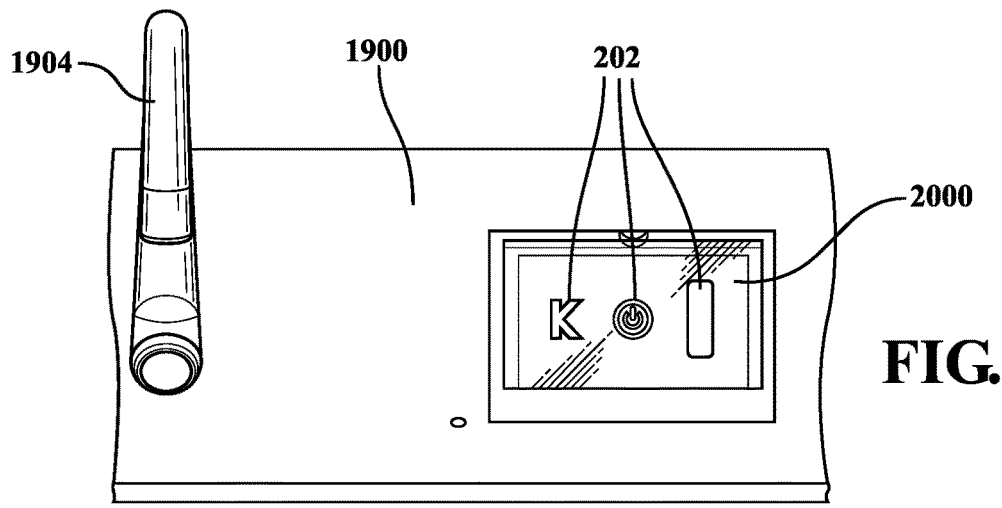

As a user approaches sink, the sensors 106 may be configured to detect a presence of the user (e.g., via ultrasonic or "chirp" sensors, via infrared sensors, etc. as shown in FIGS. 20 and 21, via radar sensors, LIDAR sensors, camera sensors, etc.). The sensors 106 may be configured to generate detection signals corresponding to the presence of the user. The sensors 106 may be configured to transmit, send, or otherwise provide the detection signals to the controller 102. In some (but not all) embodiments, the sensors 106 may be configured to measure a height of the user for modifying a position of one or more components of the display 104 (as shown in FIG. 19). For example, the controller 102 may be configured to pivot one or more components of the display 104 (e.g., beneath the projection surface 2000) as shown in FIG. 19 to modify the perspective of the projected image 202. The controller 102 may modify the perspective image 202 using movement similar to those described above with reference to FIGS. 15-18.

The user may provide user inputs to various projected images 202 of buttons for controlling the faucet 1904. For example, the user may provide inputs to a projected image 202 of an on/off symbol to commence water flow (similar to turning on the side lights 302 as described above). The sensors 106 may be configured to generate data corresponding to the position of the user's hand, finger, etc. relative to the projected image 202. The sensors 106 may transmit the data corresponding to the position of the user's hand, finger, etc. to the controller 102. The controller 102 may be configured to process the data from the sensors 106 to determine the user input to the projected image 202. The controller 102 may be configured to generate one or more valve control signals for the digital valves corresponding to the faucet 1904. For example, the controller 102 may be configured to generate a control signal to open one or more of the valves to a position which was previously used (e.g., when the faucet or shower was previously turned on), to a default setting, etc. The controller 102 may be configured to store data corresponding to such valve positions in memory (e.g., default valve positions, previous valve positions, etc.). The controller 102 may be configured to generate control signals to open the valve(s). The controller 102 may be configured to transmit the control signals to the valve(s), to cause water to flow from the faucet 1904. Where the user subsequently pushes their finger into the projected image 202 of the on/off symbol, the controller 102 may be configured to generate control signals to close the valves corresponding to the faucet 1904. Hence, the user may open and close the valve(s) for the faucet 1904 by "pressing" the projected image 202 of the on/off symbol.

In some embodiments, the user may provide user inputs to a projected image 202 of a bar for controlling water flow rate or water temperature from the faucet 1904 (or shower). For example, the user may slide their finger along the bar for modifying a water flow rate or a water temperature. As the user positions their finger towards the top of the projected image 202 of the bar, the controller 102 may be configured to generate valve control signals to increase a water flow rate (e.g., by opening both valves to the same respective proportion), to increase a water temperature (e.g., by opening a valve corresponding to a hot water source relative to a valve corresponding to a cold water source), etc. Correspondingly, as the user positions their finger towards the bottom of the projected image 202 of the bar, the controller 102 may be configured to generate valve control signals to decrease a water flow rate, to decrease a water temperature, etc. In some embodiments, the display 104 may generate and project two images 202 of a bar (e.g., one for controlling water flow rate and another for controlling water temperature). As such, the user may provide inputs to one projected image 202 of a bar corresponding to temperature control and another projected image 202 of a bar corresponding to flow rate control.

While primarily described as controlling a faucet 1904, it is noted that the systems and methods described herein may be used for controlling a shower in a shower space. For example, the display 104 may be incorporated in a shower space environment for controlling a shower or a shower heater (such as an electric shower heater, or a heater for a shower which uses water from a cold water source and electrically heats the water locally at or near the shower space). For example, the display 104 may be configured to project images 202 to a user for controlling valve(s) and a heater for the shower. A user may adjust the temperature via gestures to the projected images 202 (similar to adjustment of the temperature from the faucet 1904 described above). In some embodiments, the display 104 may be at least partially located external to the shower space (e.g., outside of the shower space) and configured to project images 202 of the controls for the shower to a user outside of the shower space. The user may provide inputs to the projected images 202 for controlling the valve(s) and/or heater prior to entering the shower space. In some embodiments, the display 104 may be located within the shower space separate from the heating elements and configured to project images 202 for the controls for the shower to a user inside the shower space. The user may provide inputs to the projected images 202 for controlling the valve(s) and/or heater while located in the shower space. Such embodiments may provide improved electric heaters for showers by removing physical controls from the heaters themselves, thereby reducing the profile and space needed for incorporating such heaters in a shower space.

In some implementations and embodiments, the system 100 depicted in FIG. 1 including the display 104 of FIG. 2 may be leveraged for controlling various devices and applications within a commercial or residential bathroom or kitchen environment including, but not limited to, electrically-controlled door devices, soap dispensers, hand towel dispensers, hand dryers, and the like. For example, the display 104 (or a plurality of displays 104) may be positioned or arranged at various locations within a public bathroom setting. The display 104 may be configured to project various images 202 within the public bathroom setting. The controller 102 may be configured to sense a user entering and using a bathroom stall (e.g., using sensors 106 positioned adjacent to a stall door, for instance). The controller 102 may be configured to receive the data from the sensors 106. The sensors 106 may be configured to generate data corresponding to a presence of the user near the bathroom stall. The sensors 106 may be configured to transmit the sensor data corresponding to the presence of the user in the stall to the controller 102. The controller 102 may be configured to parse the data to determine that the user has entered the stall. The controller 102 may be configured to automatically generate one or more control signals for controlling the stall door (e.g., opening the door, closing the door, locking the door, unlocking the door, etc.) to open or close based on the user's presence. The control signals may be sent to, for example, a pneumatic device or other actuator for opening or closing the door, an electronic lock for locking or unlocking the door, and so forth. Hence, when the user walks up to the bathroom stall and walks through the projected image 202, the controller 102 may be configured to automatically open the bathroom stall door. Furthermore, when the user walks into the bathroom stall, the controller 102 may be configured to automatically close the bathroom stall door.

While described as walking through the projected image 202, in some embodiments, the user may control the bathroom stall door by pressing a projected image 202 in the bathroom (similar to pressing the projected image 202 of an on/off symbol as described above). In this embodiment, the projected image 202 may be displaced or otherwise projected adjacent the bathroom stall door (e.g., within the interior space of the bathroom stall towards the stall door). The projected image 202 may be a lock button, for example. Upon detecting the user selecting the lock button by passing their hand or finger through the projected image 202, the controller 102 may transmit a control signal to an electronic lock of the bathroom stall door to lock the stall door while the user is located in the bathroom stall. Similarly, the user may select the projected image 202 again to unlock the bathroom stall door, and the controller 102 may detect the user selecting the lock button again (or a separate unlock button) as described above, and transmit a control signal to the electronic lock to unlock the bathroom stall door.

As another example, the controller 102 may be configured to sense a user approaching a sink deck or wash space in a bathroom, including a plurality of faucets, soap dispensers, hand dryers, towel dispensers, and so forth. The controller 102 may sense the user approaching the sink deck using sensors 106 positioned near the sink deck, such as at each of the plurality of sinks. The controller 102 may be configured to receive the data from the sensors 106. The sensors 106 may generate data corresponding to a presence of the user at the sink. The sensors 106 may be configured to transmit the sensor data corresponding to the presence of the user at the sink to the controller 102. The controller 102 may be configured to parse the data to determine that the user has walked up to the sink. The controller 102 may be configured to automatically generate and render one or more projected images 202 as described above, for controlling the plurality of sink devices (e.g., dispensing soap, turning on or off a faucet, adjusting a water temperature, dispensing hand towels, turning on a hand dryer, etc.) based on various interactions with the respective projected images 202. The projected images 202 may be rendered or projected proximate to, above, below, adjacent to, or otherwise near the sink device which is to be controlled. For example, projected image(s) 202 for controlling the faucet and soap dispenser may be rendered or projected above a sink basin or behind the faucet. Similarly, projected image(s) 202 for controlling the towel dispenser or hand dryer may be rendered or projected adjacent (e.g., on the left or right side, above, below, in front of, etc.) the towel dispenser or hand dryer, respectively.

As an example, a user approaching a sink basin may select a first projected image 202 to turn on the faucet, swipe a second projected image 202 to adjust the water temperature of water from the faucet, select a third projected image 202 to dispense soap from the soap dispenser, and wash their hands. The controller 102 may detect the selection and swipe inputs based on data received from the sensors 106. The controller 102 may generate control signals for the faucet and soap dispenser (e.g., to actuator-controlled valve(s), an actuator-controlled pump(s), etc. of the faucet and/or soap dispenser), according to the selection/swipe inputs. Following washing their hands, the user may select the first projected image 202 (or a different projected image 202) to turn off the faucet. The controller 102 may detect the selection of the projected image 202, and generate a control signal for the faucet, to turn off the faucet as described above. The user may then approach a hand dryer or towel dispenser, and select a projected image 202 for controlling the hand dryer or towel dispenser. The controller 102 may detect selection of the projected image 202, and transmit one or more control signals to the hand dryer/towel dispenser (e.g., to activate a blower, to control a motor or actuator to output a hand towel, etc.) according to the selection.

In some embodiments, the controller 102 may be configured to selectively control the light source 108 to generate the projected images 202. For example, as shown in the progression between FIGS. 24-26, the controller 102 may activate the light source 108 to project light corresponding to a first projected image 202 (e.g., a logo, an on button, etc.) when the user is detected to be located at the sink. Once the user "presses" the first projected image 202, the controller 102 may control the light source 108 to project light corresponding to projected images 202 for controlling the faucet 1904. Such embodiments may conserve power by only projecting images on an as-needed or on-demand basis. In some embodiments, the controller 102 may be configured to modify a color or opacity of the projected images 202 based on the detected inputs. For example, as the user changes the temperature of water from the faucet 1904, the controller 102 may control the light source 108 corresponding to the projected image 202 of the bar for temperature control to change a color of the bar (e.g., between red and blue). Similarly, as the user changes the water flow rate from the faucet 1904, the controller 102 may control the light source 108 corresponding to the projected image 202 of the bar for water flow rate control to change an opacity of the bar (e.g., between a deep blue at fully open flow rate and an opaque blue as the flow rate decreases). While these embodiments are described, it is noted that other devices and/or components may be controlled via the projected image(s) 202. For example, the display 104 may be configured to project images 202 for controlling a motorized drain, waste or garbage disposal, mood lighting for the faucet 1904, and so forth. A user may provide gestures via the projected image(s) 202 to control such devices. For example, the user may "select" a projected image 202 of a button to turn on and off a motorized drain or waste disposal at the sink 1902. The controller 102 may be configured to detect such gestures via the sensor(s) 106, and generate control signals for the motorized drain and/or waste disposal. Similarly, the user may adjust mood lighting for the faucet 1904 via various projected images 202 of slider bars (e.g., for modifying color, intensity, opaqueness, etc.). The controller 102 may be configured to detect such gestures and modify ambient and/or mood lighting located at the sink 1902.

Figure 27:
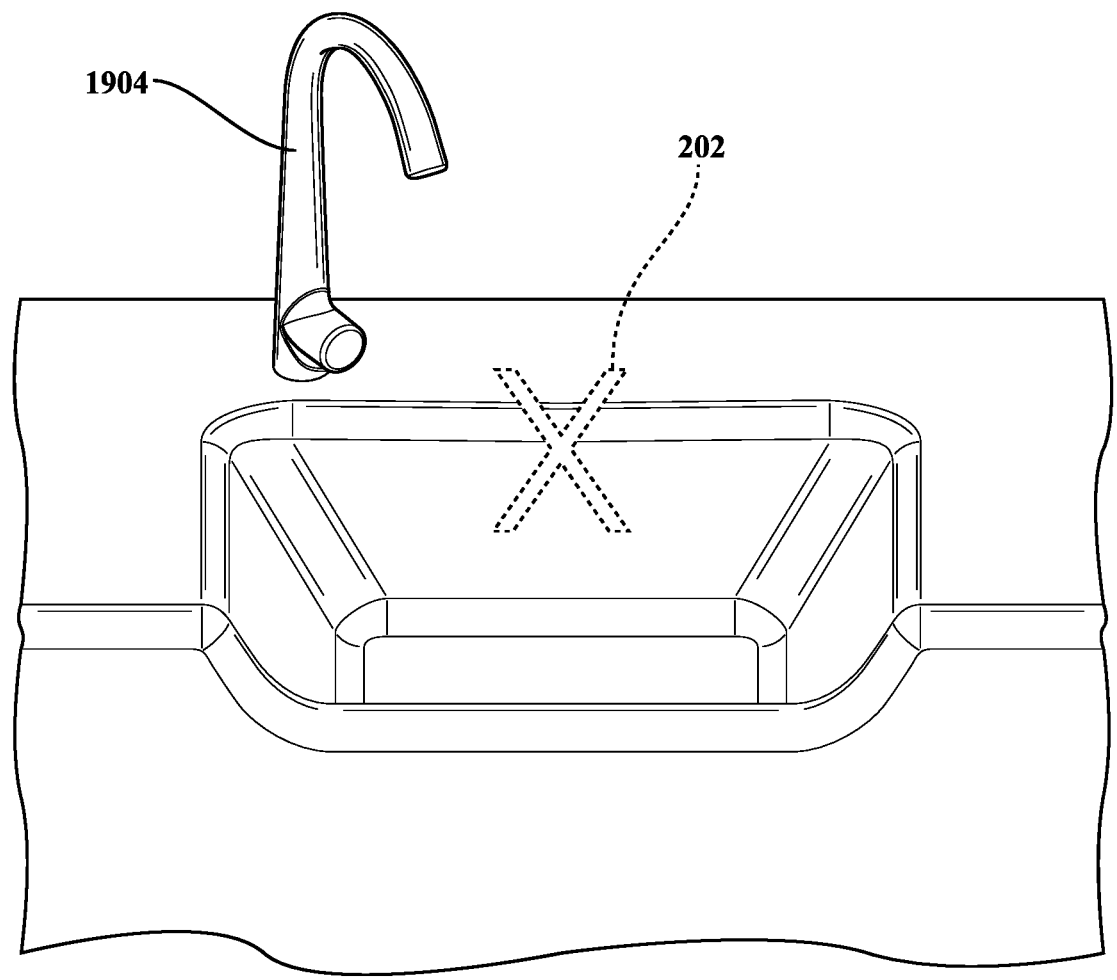
FIG. 27 shows a perspective view of a sink including a projected image of a notification, according to an illustrative embodiment.

As shown in FIG. 27, and in some embodiments, the controller 102 may be configured to generate one or more control signals for the light source 108 for providing a projected image 202 corresponding to a notification or alert to a user located at the sink 1902. For example, where a faucet 1904 is being used for performing a thermal disinfection (e.g., using scalding hot water), the controller 102 may be configured to generate a light source control signal to generate a notification or alert (e.g., a red "X") to indicate to the user that the faucet 1904 is expelling high-temperature water and to be cautious when using. The controller 102 may be communicably coupled to a temperature sensor configured to sense water temperature from the faucet 1904. The controller 102 may be configured to compare the sensed water temperature to a threshold. Once the water temperature exceeds the threshold, the controller 102 may be configured to control the light source to generate the projected image 202 corresponding to the alert. Such embodiments may provide an automatic and intuitive alert to a user who may have otherwise unknowingly used the sink.

In some embodiments, the controller 102 may be configured to generate one or more control signals for the light source 108 for providing a projected image 202 corresponding to a logo or design corresponding to the faucet 1904 and/or the sink 1902. For example, the controller 102 may be configured to project an image 202 corresponding to a logo for the faucet as a user approaches the sink 1902. The controller 102 may be configured to detect the user approaching the sink using data from the sensors 106. In some embodiments, the controller 102 may be configured to project the image 202 corresponding to the logo or design corresponding to the faucet 1904 as a default setting (e.g., the controller causes the display 104 to project an image 202 corresponding to the logo until a user is located at the sink 1902). Once the user is located at a predetermined distance from the sink 1902 (e.g., based on data from the sensors 106 in comparison with a predetermined threshold), the controller 102 may be configured to generate one or more control signals for the light source 108 to switch from displaying a projected image 202 corresponding to the logo for the faucet 1904 to displaying projected images 202 corresponding to controls for the faucet 1904. Similar systems may be incorporated into other embodiments and use cases, such as displaying a logo or design in other spaces (e.g., in a room prior to or as a user enters the room, in a shower or bathroom environment, and the like). Additionally, because the perspective and viewing angle of the projected images 202 may be modified by the controller 102, the projected image 202 of the logo may be viewable from multiple viewing angles and at multiple perspectives within the space in which the image 202 is projected.

Figure 28:
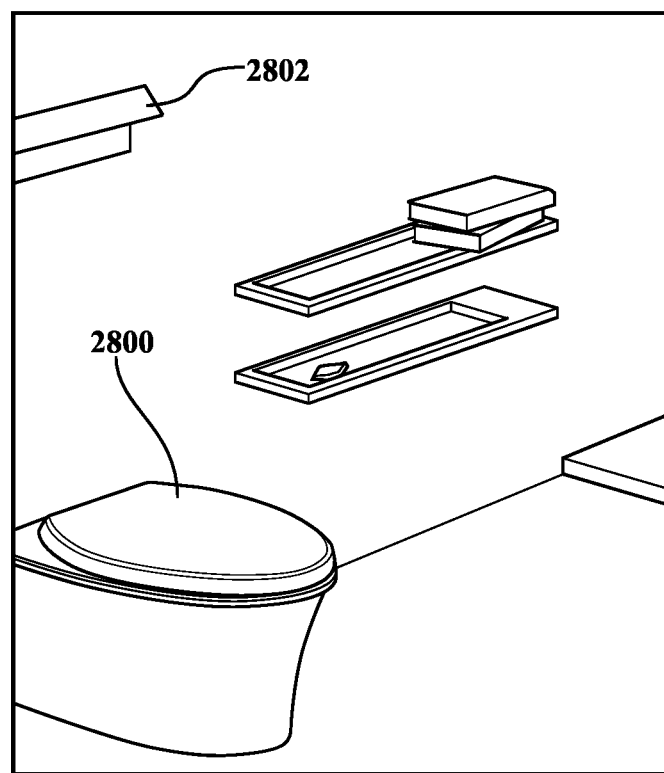
FIG. 28 and FIG. 29 show a perspective and front view of a bathroom environment including the projection system of FIG. 1, according to illustrative embodiments.
Figure 29:
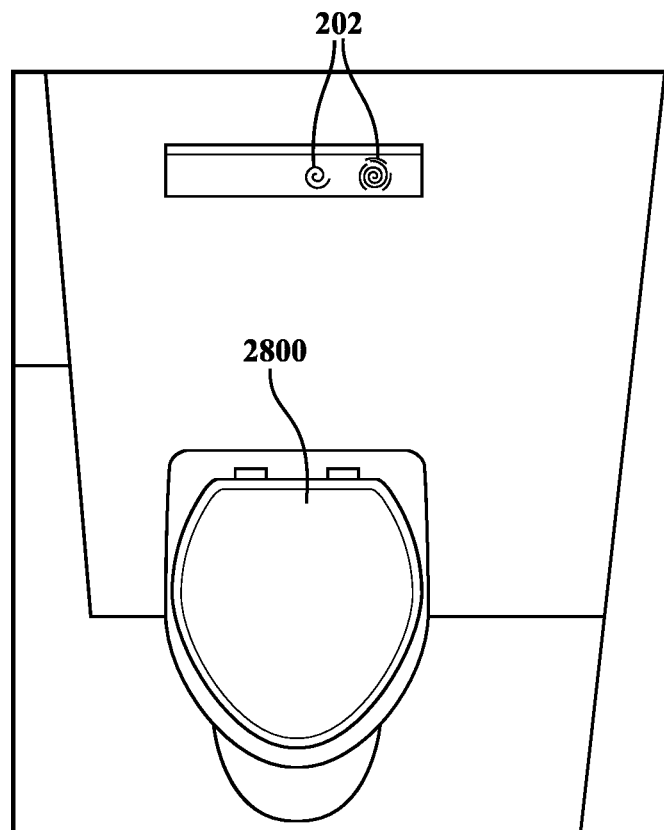

Referring now to FIGS. 28-29, the system 100 depicted in FIG. 1 including the display 104 of FIG. 2 may be incorporated into a bathroom environment. Specifically, FIGS. 28-29 show two views of a toilet 2800 which may be controlled by the controller 102 of FIG. 1. The display 104 may be included, formed, or otherwise positioned above the toilet 2800 (e.g., in an overhead unit 2802). The controller 102 may be configured to sense a user approaching the toilet 2800 (e.g., using sensors 106 similar to those described above). The controller 102 may be configured to control the display 104 to generate a projected image 202 for flushing the toilet 2800. In some embodiments, the controller 102 may be configured to control the display 104 to generate a projected image 202 corresponding to long and short flush sequences (e.g., for flushing solids and liquids). The controller 102 may be communicably coupled to a toilet valve corresponding to the toilet 2800. The controller 102 may be configured to generate valve control signals for the toilet valve to flush the toilet 2800 based on detected positions of the user's hand or fingers relative to the projected images 202.

In some embodiments, such as those shown in FIG. 29, the display 104 may be configured to project two images 202 corresponding to a short and long flush sequence. The display 104 may be configured to project an image 202 of a small swirl for a short flush sequence and an image 202 of a large swirl for a long flush sequence. A user may interact with the projected images 202 to provide inputs for the controller 102. For example, the user may "push" their finger through the projected image 202 of the small or large swirls shown in FIG. 29. The sensors 106 may be configured to generate data corresponding to the user inputs. The sensors 106 may be configured to generate data corresponding to a first detected position of the user's hand (or finger) along with a path of the user's hand (or finger). The sensors 106 may be configured to transmit, send, or otherwise provide the data to the controller 102 for interpretation.

Similar to detecting a user "pressing" the on/off symbol as described above, the controller 102 may be configured to generate valve control signals for various digital valve(s) of the toilet 2800 based on the detected user input. For example, where the user pushes their finger into the projected image 202 of the small swirl, the controller 102 may be configured to generate one or more valve control signals to open the valve(s) of the toilet 2800 for a first duration of time corresponding to a short flush sequence (e.g., to flush fluids). Where the user pushes their finger into the projected image 202 of the large swirl, the controller 102 may be configured to generate one or more valve control signals to open the valve(s) of the toilet 2800 for a second duration of time corresponding to a long flush sequence (e.g., to flush solids). Following lapsing of the first or second duration of time, the controller 102 may generate valve control signal(s) to close the valves. While described as two flush sequences, in some embodiments, the display 104 may show a single button for a fixed flush sequence which is used for flushing both solids and fluids. Furthermore, the controller 102 may be configured to generate control signals for the light source 108 to project additional images 202 for controlling other aspects of the toilet 2800. For example, the toilet 2800 may be a smart toilet, such as the NUMI intelligent toilet. The controller 102 may be configured to project images 202 for controlling lighting corresponding to the toilet 2800, heated seat temperature, bidet or cleansing functions, and the like. Additionally, where the smart toilet has a speaker system, the controller 102 may be configured to project images 202 for controlling audio sources and audio output from the speaker system. Accordingly, the systems and methods described herein may be used for controlling various aspects and features of a smart toilet 2800.

Figure 31:
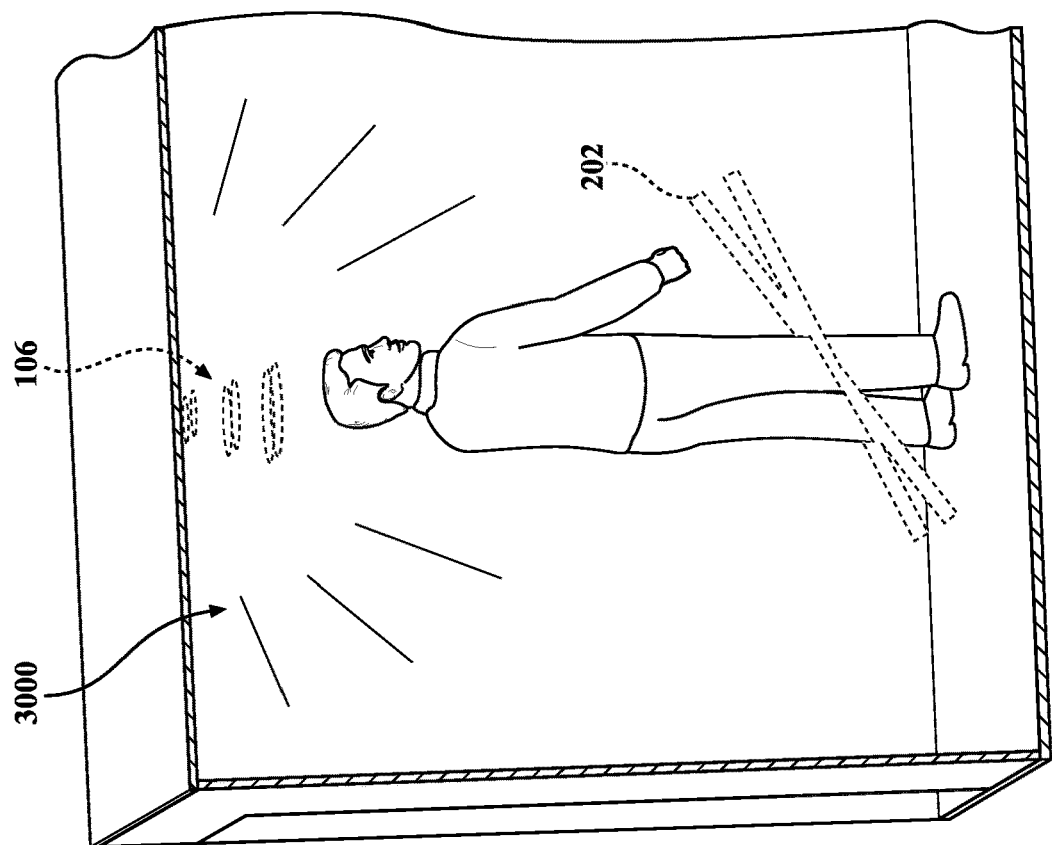
FIG. 30 and FIG. 31 show side views of a room or space including the projection system of FIG. 1 for controlling lights in the room or space, according to illustrative embodiments.
Figure 30:
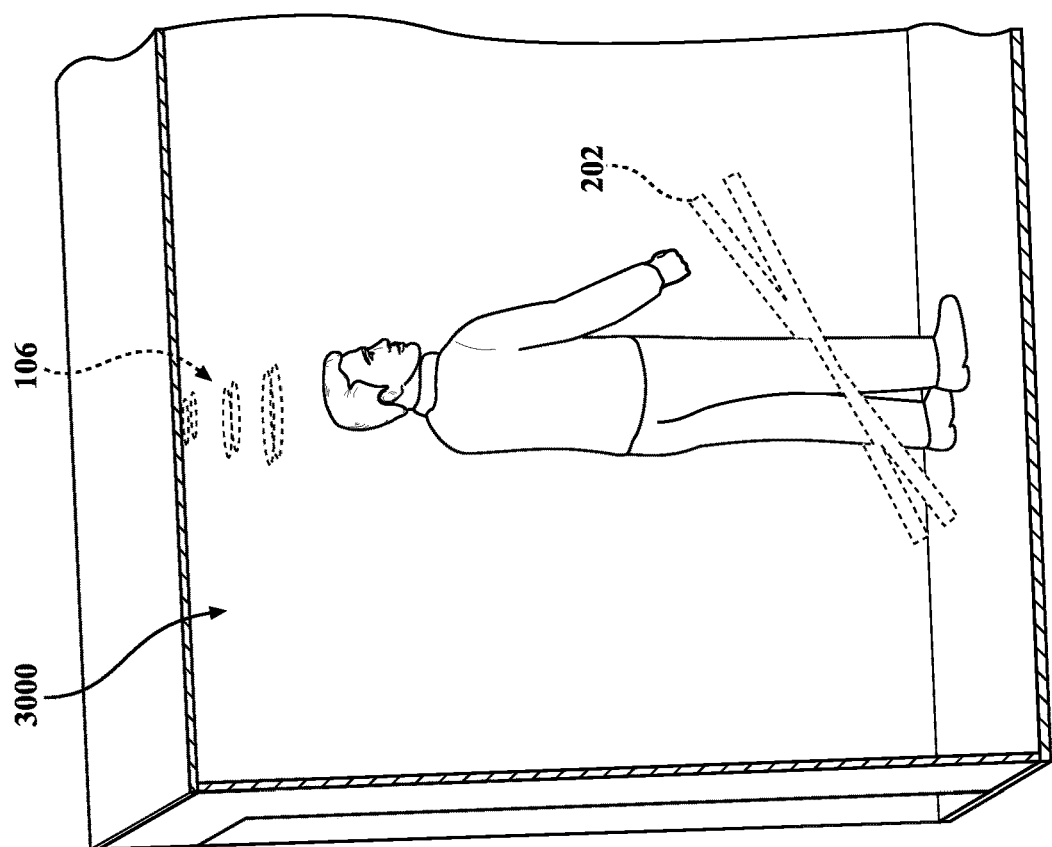

Referring now to FIGS. 30-31, the system 100 depicted in FIG. 1 including the display 104 of FIG. 2 may be leveraged for controlling lighting applications. Specifically, FIGS. 30-31 show two views of a room 3000 in which a user may enter and automatically turn on lights within the room 3000 by providing an input to a projected image 202. The display 104 may be included, formed, or otherwise positioned overhead in the room 3000 (e.g., in the ceiling, for example). The controller 102 may be configured to project an image 202 into the room 3000 within a sensing zone corresponding to the sensors 106. The controller 102 may be configured to sense a user entering the room 3000 (e.g., using sensors 106 positioned in the ceiling, for instance). The controller 102 may be configured to receive the data from the sensors 106. The sensors 106 may generate data corresponding to a presence of the user in the room 3000. The sensors 106 may be configured to transmit the sensor data corresponding to the presence of the user in the room 3000 to the controller 102. The controller 102 may be configured to parse the data to determine that the user has entered the room 3000. The controller 102 may be configured to automatically generate one or more light control signals for lights positioned within the room 3000 (e.g., ambient lights, lamps, overhead lights, etc.) to turn on the lights in the room 3000. Hence, when the user walks into the room 3000 and walks through the projected image 202, the controller 102 may be configured to automatically turn on the lights in the room 3000. While described as walking through the projected image 202, in some embodiments, the user may control the lights in the room 3000 by pressing a projected image 202 in the room 3000 (similar to pressing the projected image 202 of an on/off symbol as described above). In some embodiments, the controller 102 may be configured to generate control signals for the light source 108 to output light for generating a projected image 202 of a control panel for a user. The control panel may be used for controlling different room lights (e.g., separate zones of lights within a room or external to the room), audio/visual devices within the room, air conditioning devices for the room (e.g., similar to thermostat controls), and the like. The user may provide gestures to the projected image 202 of the control panel for controlling such devices.

Figure 32:
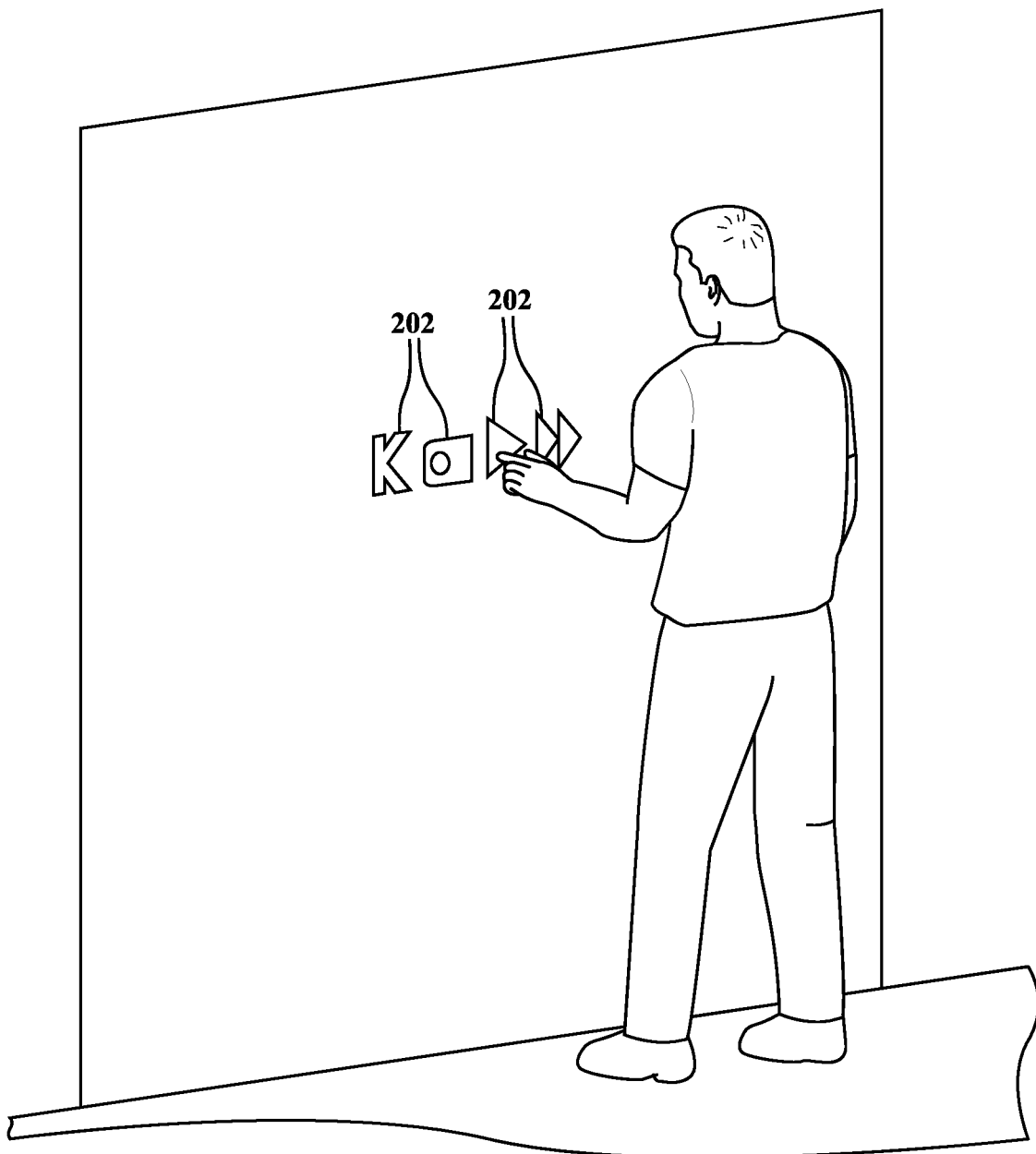
FIG. 32 shows a view of an environment including the projection system of FIG. 1 used for controlling a media source, according to an illustrative embodiment.
Figure 33:
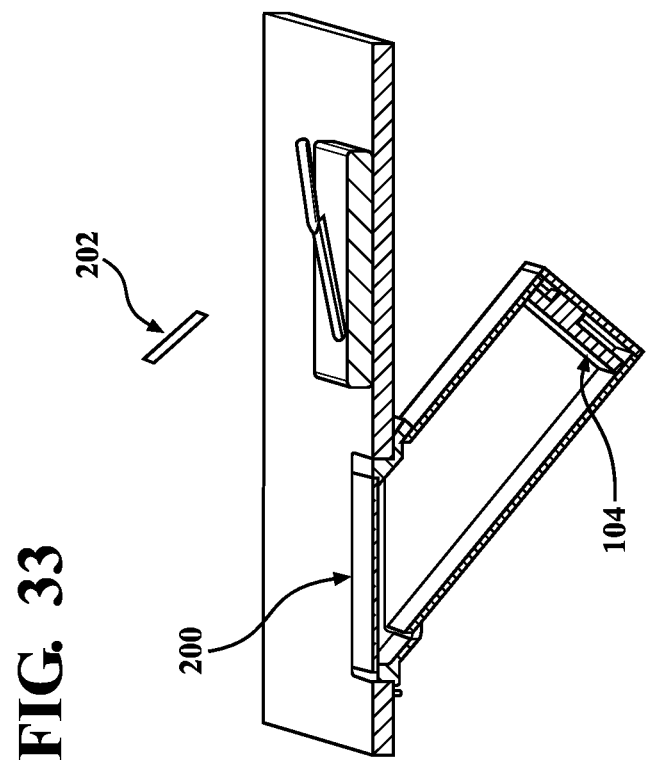
FIG. 33 and FIG. 34 show a side view and a perspective view of a workspace in a kitchen environment including the projection system of FIG. 1, according to illustrative embodiments.
Figure 34:
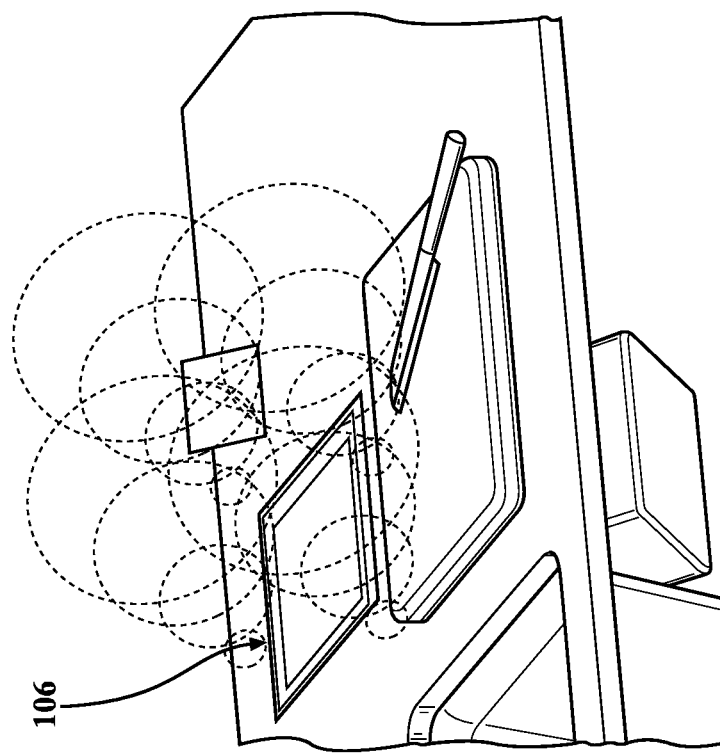
Figure 35:
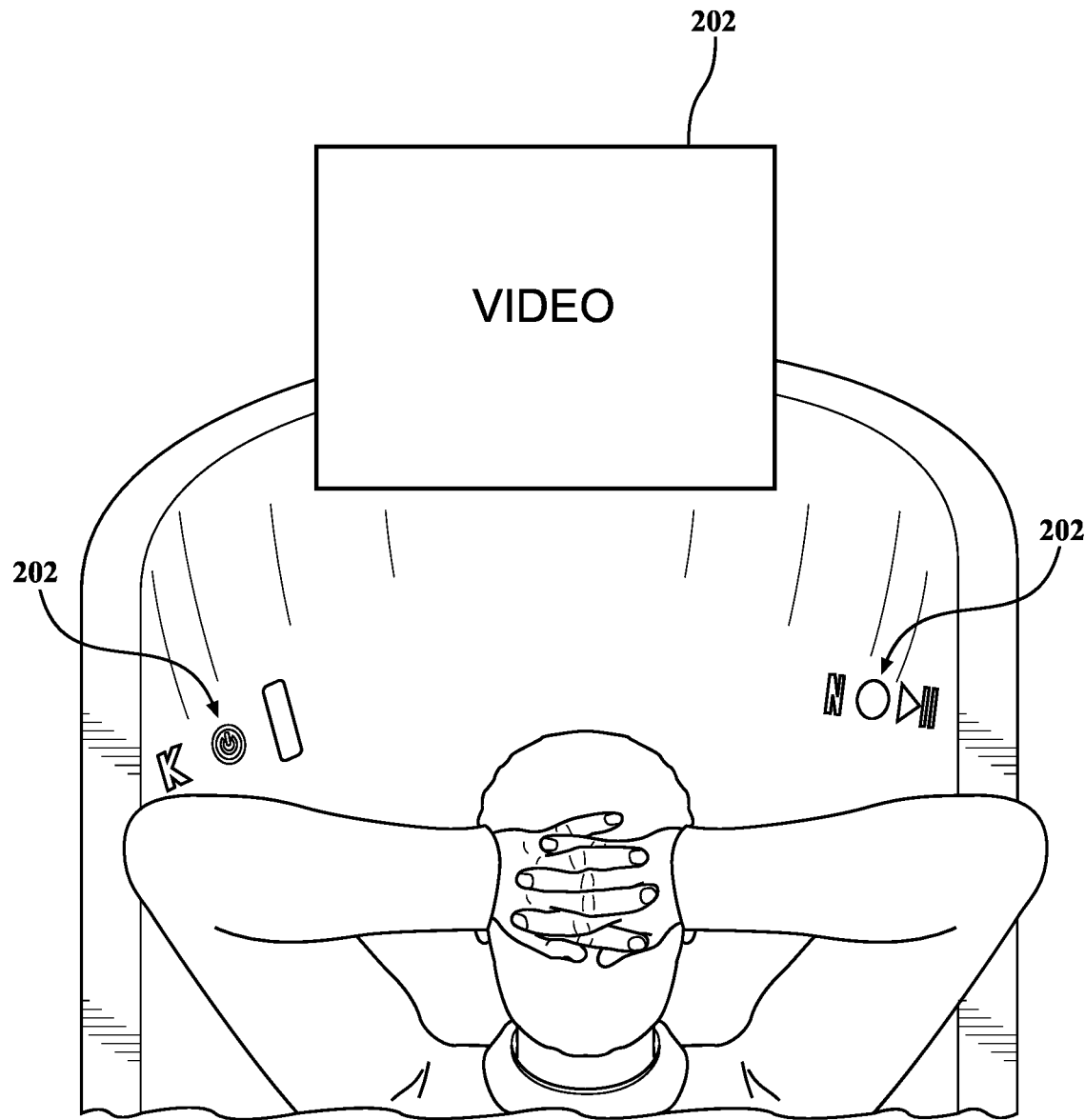
FIG. 35 shows a perspective view of a bathtub including the projection system of FIG. 1 having multiple displays, according to an illustrative embodiment.

Referring now to FIGS. 32-35, the system 100 depicted in FIG. 1 including the display 104 of FIG. 2 may be leveraged for controlling devices in various radio, video, or other media applications. Specifically, FIG. 32 show a view of a projected image 202 for controlling a radio or video input, FIGS. 33-34 show views of a kitchen environment including a projected image 202 of a video or recipe, and FIG. 35 shows a view of a bathtub 3500 including a projected image 202 of a video along with projected images of controls for the video and the bathtub 3500.

As shown in FIG. 32, the controller 102 may be configured to control the display 104 to generate projected images 202 of buttons for controlling a radio, video, or other media source. For example, the controller 102 may be configured to control the display 104 to project images 202 responsive to detecting a user located in the space including the media source. The controller 102 may be configured to control the light source 108 to project an image 202 of a play button, a pause button, a skip button, a volume control bar, etc. The controller 102 may be configured to detect user inputs corresponding to the projected images 202 of the buttons based on data from the sensors 106 arranged in the space including the media source. The controller 102 may be configured to generate control signals for transmitting to the media source based on the detected inputs from the user (e.g., to play music or a video, to fast forward or skip, to pause the music or video, to change a volume).

In the embodiment shown in FIGS. 33 and 34, the controller 102 may be configured to control the display 104 generate projected images 202 of a recipe or instructional video in a kitchen environment. The controller 102 may be configured to receive data corresponding to the recipe or instructional video from an internet source (e.g., based on inputs from a user to a computing device), from a mobile device paired to the controller 102, etc. The controller 102 may be configured to control the display 104 to project images 202 responsive to detecting a user located in the kitchen. The controller 102 may be configured to control the light source 108 to project an image 202 of the recipe, the video instructions, etc. In this embodiment, the light source 108 may be a high brightness, high definition display (e.g., an LED screen, an LCD screen, etc.). In some embodiments, the controller 102 may be configured to control the light source 108 to project additional images 202 of buttons for controlling the recipe, video instructions. The controller 102 may be configured to detect user inputs corresponding to the projected images 202 of the buttons based on data from the sensors 106. The controller 102 may be configured to update the images 202 of the recipe or video instructions based on the detected inputs (e.g., to advance the recipe or video instructions, pause the recipe or video instructions, etc.).

In some embodiments, the controller 102 may be configured to generate control signals for one or more appliances which are located the kitchen environment based on inputs provided by the user to the projected images 202. For example, the controller 102 may be communicably coupled to (e.g., via respective APIs) to various appliances in a kitchen environment. The controller 102 may be communicably coupled to a smart stove or oven, a smart refrigerator, smart food mixer, blender, kettle, etc. The controller 102 may be configured to project images 202 for controlling the devices in the kitchen environment. The controller 102 may be configured to detect gestures to the projected images 202. Such projected images 202 may be incorporated into the projected image 202 of a recipe (as described above). In some embodiments, the projected images 202 of controls for controlling smart appliances may be separate from the projected image 202 of a recipe. The controller 102 may be configured to generate control signals to transmit (e.g., wirelessly via a corresponding API to an address associated with the device) for controlling such devices. As an example, a user may "select" a projected button for preheating a smart oven. The controller 102 may be configured to detect the user's gesture to the projected image 202 of the button for preheating the smart oven. The controller 102 may be configured to generate a control signal for the smart oven to preheat the smart oven based on the user's gesture. Similar examples may be provided for other smart devices in a kitchen environment (e.g., providing a predetermined amount of water from a water outlet in a smart refrigerator, turning on a smart food mixer or blender, heating water via a smart kettle to a temperature or for a duration, etc.).

In the embodiment shown in FIG. 35, the controller 102 may be configured to control the display 104 generate projected images 202 of a video in a bathtub 3500 environment. For example, a bathtub 3500 may include a first display 104 for projecting images 202 of a first set of controls for controlling water temperature, jets, etc. in the bathtub 3500, a second display 104 for projecting a series of images 202 (e.g., a video) from a media source, and a third display 104 for projecting images 202 a second set of controls for controlling the video. The controller 102 may be configured to detect inputs to images 202 of the first set of controls and inputs to images 202 of the second set of controls. The controller 102 may be configured to control valves corresponding to a water source of the bathtub 3500 (as described above with reference to FIGS. 19-26) based on the detected inputs to the projected images 202 of the first set of controls. The controller 102 may be configured to control the media source corresponding to the video projected in the bathtub 3500 environment (as described above with reference to FIG. 32) based on the detected inputs to the projected images 202 of the second set of controls.

In some embodiments, the controller 102 may be configured to control various devices in a closet or wardrobe. For example, a closet or wardrobe may have motorized drawers and doors, motorized watch holders, and the like. The controller 102 may be communicably coupled to the motors corresponding thereto. The controller 102 may be configured to control the display 104 to project images 202 for controlling the motorized drawers, doors, watch holders, etc. A user may "select" projected images of controls for the motorized drawers, doors, watch holders, etc. The controller 102 may be configured to generate motor control signals for motors coupled to drawer slides to slide open the motorized drawers. Similarly, the controller 102 may be configured to generate motor control signals for motors coupled to joints to pivot or rotate open motorized doors. The controller 102 may be configured to generate motor control signal for motors configured to rotate a motorized watch holder. In some embodiments, various combinations of the aforementioned systems and methods may be used for providing increased user experiences. For example, a person walking into their closet may select a projected image 202 of a button for turning on lights in the closet. The person may then select projected image 202 of various controls for controlling motorized devices in the closet (e.g., to open various drawers, to view watches, etc.). Once the person is ready, the person can exit the closet and turn off the lights by selecting the projected image 202 of the button.

It is noted that, while the systems and methods described herein are described in terms of controlling interior household devices (such as smart mirrors, lighting, faucets, showerheads and heaters for showers, bathtubs, toilets, audio and/or video components, air conditioning, and the like), the systems and methods described herein may be used for controlling other household or industrial equipment. For instance, the systems and methods described herein may be used for controlling generators and engines. The display 104 may be incorporated, embedded, or otherwise included in a generator, an engine, etc. The controller 102 may be communicably coupled to the generator (or the engine). The controller 102 may be configured to control the display 104 to project images 202 for controlling the generator, the engine, and so forth. The controller 102 may be configured to generate generator or engine control signals based on detected gestures corresponding to the projected images 202. As one example, the display 104 may be configured to project images 202 for turning on a generator or engine, for activating a switch to change a power source for a home from a main power source to a generator, for modifying a period to periodically activate a generator or engine for diagnostic checks, and the like. The controller 102 may be configured to detect gestures to the projected images 202. The controller 102 may be configured to generate engine or generator control signals based on the detected gestures. Accordingly, the systems and methods described herein may be used for touchless control of generators, engines, and the like.

Figure 38:
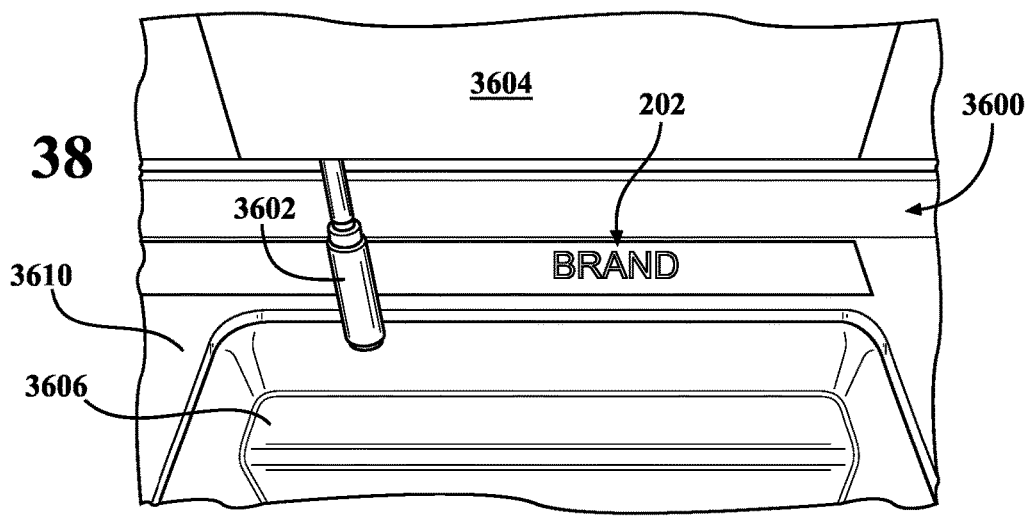

Referring now to FIG. 36-38, depicted are views of a kitchen environment 3600 including the system 100 of FIG. 1, according to another illustrative embodiment. In some embodiments, the system 100 and/or display 104 may be incorporated into the kitchen environment 3600 for both moving and controlling devices in the kitchen environment 3600. In some embodiments, the system 100 may be used for controlling a position of a cabinet mounted faucet 3602. As shown in FIG. 36, the faucet 3602 may be mounted in a cabinet 3604 located above a sink 3606. In some embodiments, the faucet 3602 may be mounted within a track 3608 in the cabinet 3604. The cabinet 3604 may further include various motors, gears, tracks, etc. for moving the faucet 3602. As described in greater detail below, the faucet 3602 may be configured to move laterally (e.g., relative to the sink 3606) and/or vertically (e.g., away from or towards the sink 3606) within the track 3608.

The display 104 may be mounted along a backside of the countertop 3610 relative to the sink 3606. As shown in FIG. 36 and FIG. 38, the display 104 may be configured to project an image 202 to a person at the sink 3606 within the kitchen environment 3600. In some embodiments, the image 202 may be an image 202 of a logo corresponding to the sink 3606, the faucet 3602, etc. Where the user selects the image 202 (e.g., by "pressing" the image 202 as shown in FIG. 36), the faucet 3602 may descend from the cabinet 3604 (e.g., from the track 3608 in the cabinet 3604) toward the sink 3606 as shown in the progression between FIG. 36, FIG. 37, and FIG. 38. Thus, a faucet 3602 may be selectively moved from a retracted position shown in FIG. 36 (e.g., such that the faucet 3602 is not visible to a user located at the sink 3606) and in a usable position as shown in FIG. 38.

Figure 39:
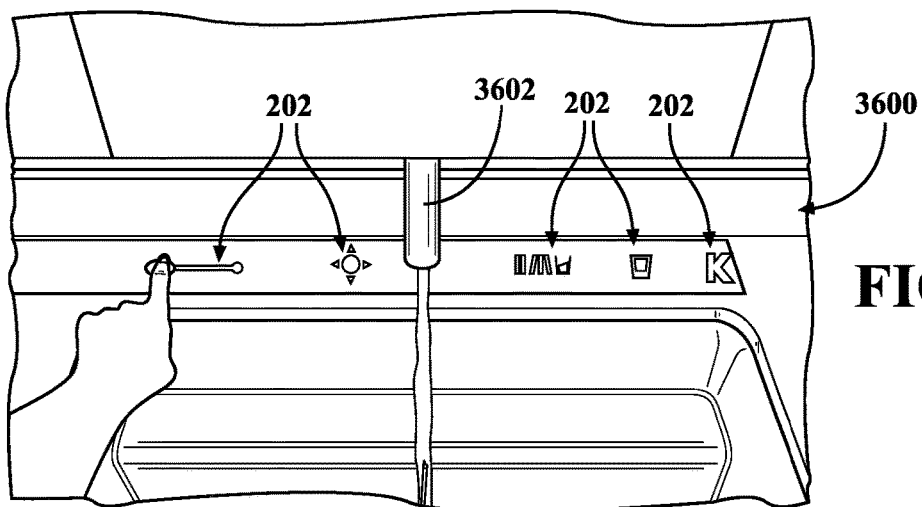
FIG. 39 through FIG. 41 show views of the kitchen environment of FIG. 36 where various characteristics of the faucet are controlled via the projection system of FIG. 1, according to illustrative embodiments.
Figure 40:
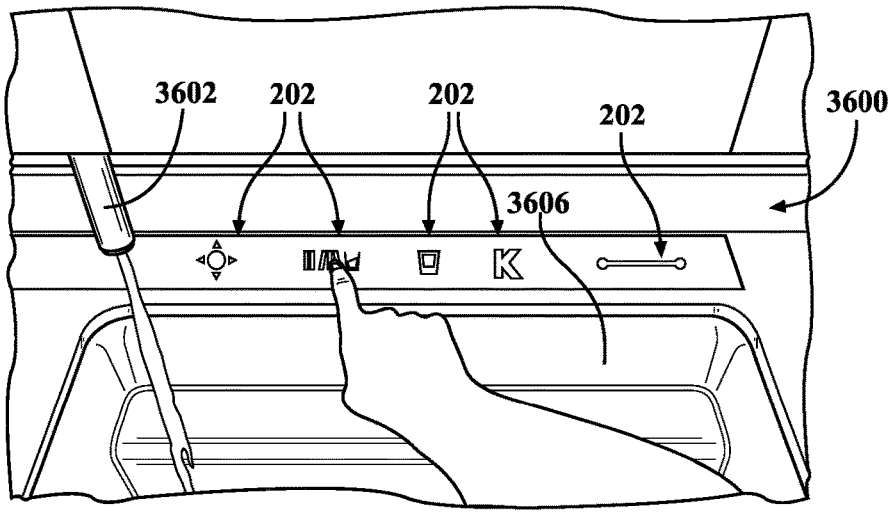
Figure 41:
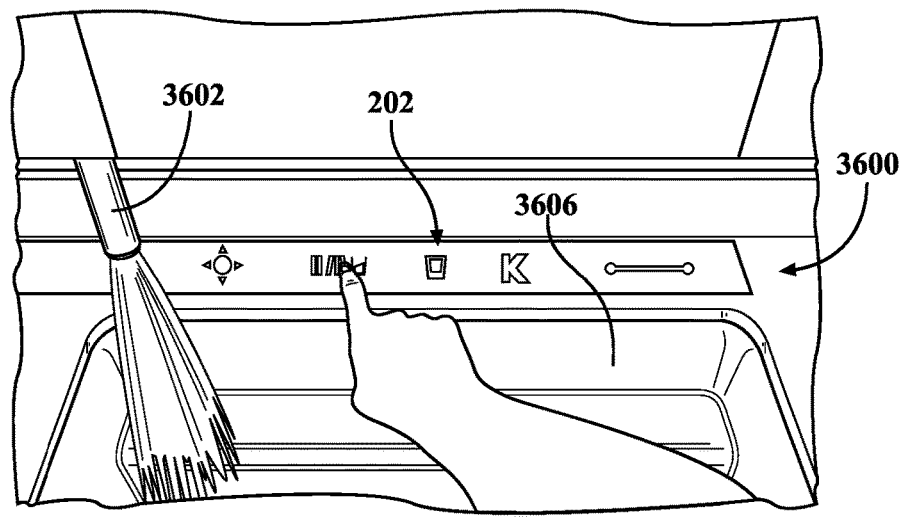

When the faucet 3602 is in the usable position in FIG. 38, the display 104 may be configured to project images 202 for controlling various aspects of the faucet 3602. Referring now to FIGS. 39-41, depicted are various views of images 202 which may be displayed for controlling the faucet 3602, according to illustrative embodiments. The display 104 may display an image 202 of a temperature control slider bar for controlling temperature of water flowing from the faucet 3602. As shown in FIG. 39, a user may "slide" their finger along the image 202 of the temperature control slider bar for modifying a temperature of water flowing from the faucet 3602. In some embodiments, as the user modifies the temperature of the water flowing from the faucet 3602, lights on the faucet 3602 facing the user may change color (e.g., according to temperature of the water as described above with reference to FIGS. 19-26).

As shown in FIGS. 40 and 41, the display 104 may be configured to display images 202 for modifying a spray pattern of water flowing from the faucet 3602. For example, the display 104 may be configured to display 104 an image 202 of symbols for switching between a stream (shown in FIG. 40) and spray (shown in FIG. 41). When the user selects the image 202, the controller 102 may be configured to generate a control signal for the faucet 3602 to switch between the stream and spray patterns for the faucet 3602. Accordingly, a user may switch spray patterns without physically touching or manipulating the faucet 3602. The display 104 may further be configured to display images 202 of buttons for further controlling the water flow from the faucet 3602. For example, the display 104 may display an image 202 of a button to fill a cup of water. When selected, the controller 102 may be configured to generate a control signal for valves to output a predetermined amount of water (e.g., a cup, 16 fl. oz., etc.). In some embodiments, a user may be able to modify the predetermined amount (e.g., by selecting another "button").

Figure 42:
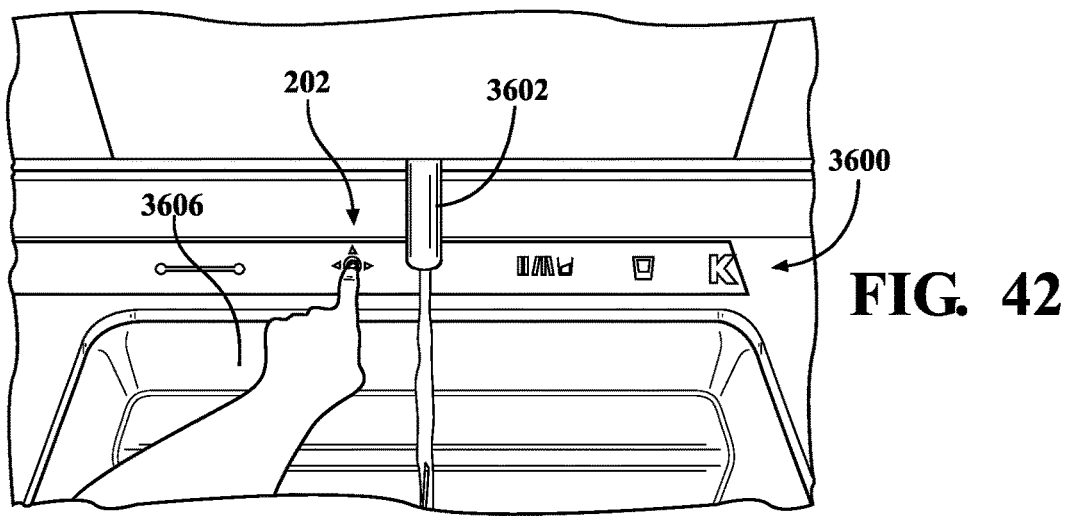
FIG. 42 through FIG. 45 show views of the kitchen environment of FIG. 36 where a position of the faucet relative to a sink is controlled via the projection system of FIG. 1, according to illustrative embodiments.
Figure 43:
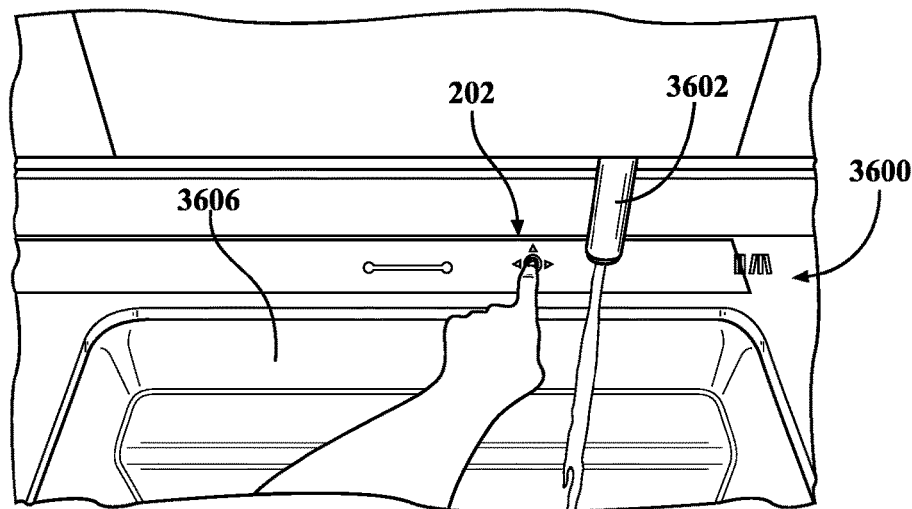
Figure 44:
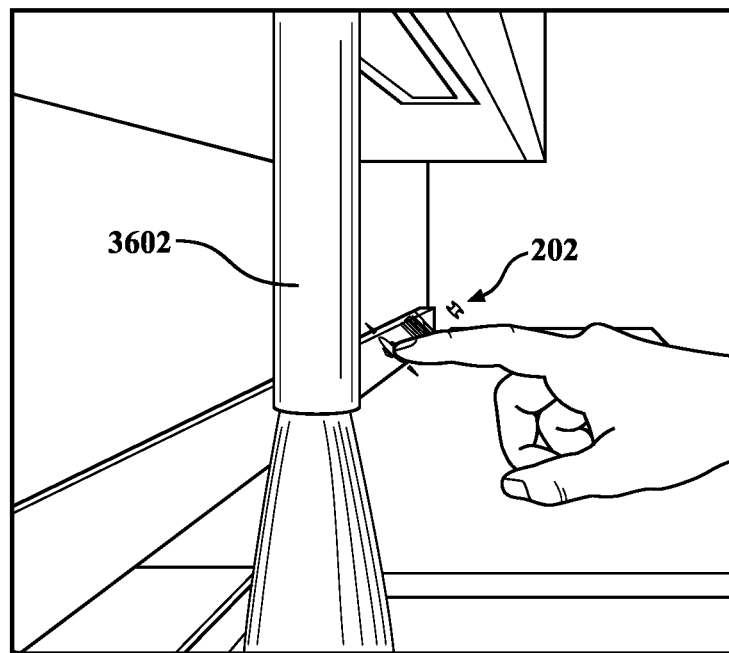
Figure 45:
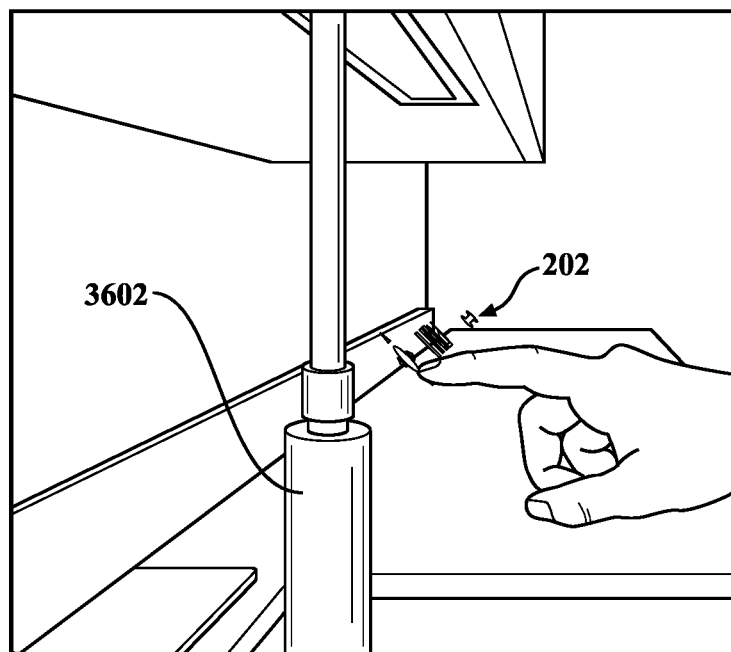

In some embodiments, a user may be able to control a position of the faucet 3602 relative to the sink 3606. Referring now to FIGS. 42-46, depicted are various views in of a kitchen environment 3600 in which the faucet 3602 is moved relative to the sink 3606. As shown in FIG. 42, the display 104 may be configured to display an image 202 of a directional controller including up and down arrows and side-to-side arrows. A user may "slide" the image 202 of the directional controller along the arrows for controlling the position of the faucet 3602 relative to the sink 3602. As shown in the progression between FIG. 42 and FIG. 43, as the user slides the image 202 of the directional controller side to side, the faucet 3602 may move with the image 202 relative to the sink 3606. The controller 102 may be configured to generate control signals for a motor coupled to the faucet 3602 for controlling a lateral position of the faucet 3602 (e.g., within the track 3608). The controller 102 may be configure to cause the motor to move the faucet 3602 with the movements of the image 202. Similarly, and as shown in the progression between FIG. 44 and FIG. 45, as the user slides the image 202 of the directional controller up and down, the faucet 3602 may move up and down relative to the sink 3606. The controller 102 may be configured to generate control signals for a motor coupled to the faucet 3602 for controlling a vertical position of the faucet 3602 (e.g., within the track 3608). Thus, a user may move the faucet 3602 up and down and left and right by providing gestures to the image 202 of the directional controller. When the user is no longer using the faucet 3602, the user may press an image 202 of a button (e.g., a logo corresponding to the sink 3606 or faucet 3602), and the faucet 3602 may be retracted into the position shown in FIG. 36.

Figure 46:
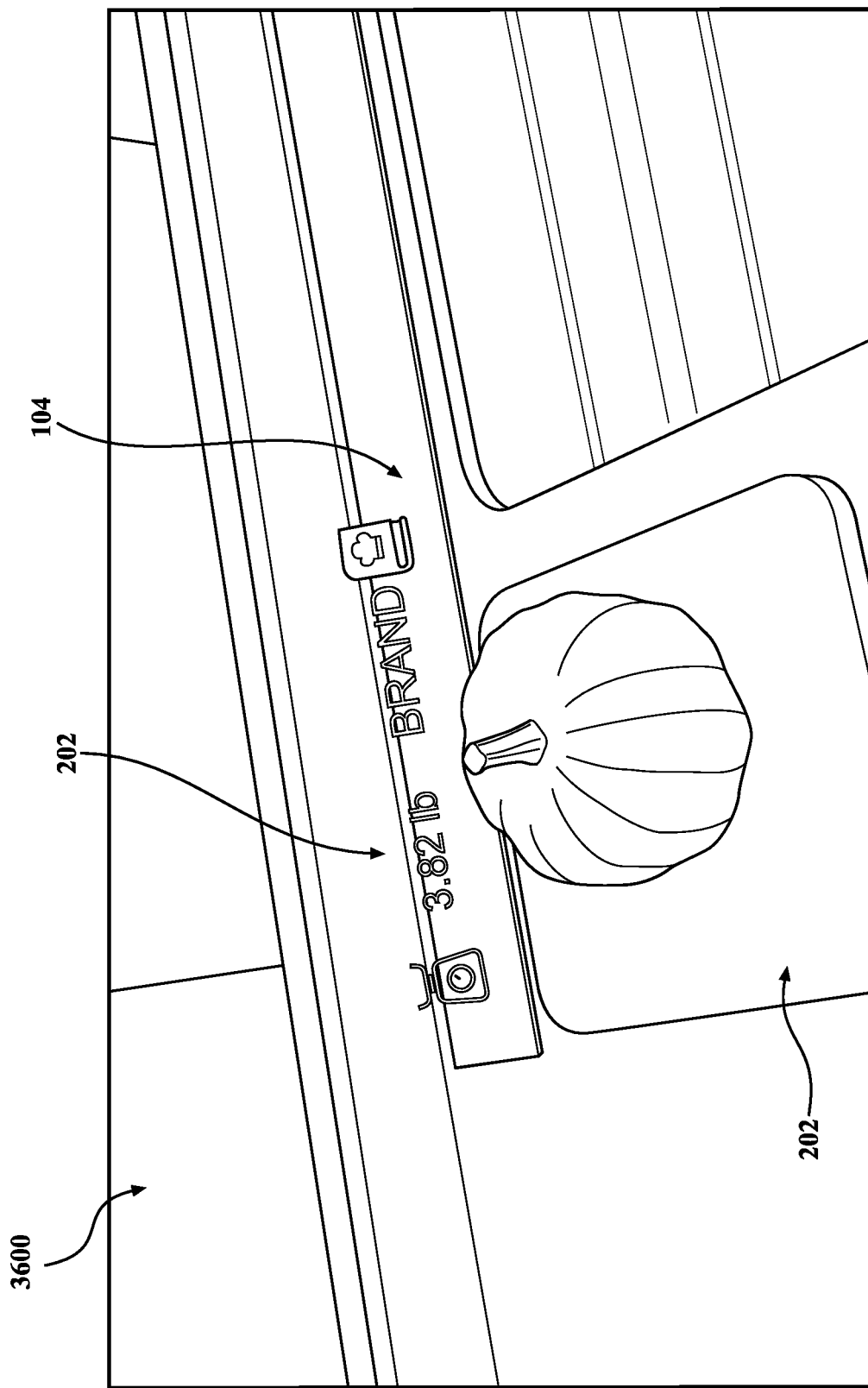
FIG. 46 shows the kitchen environment of FIG. 36 in which the projection system of FIG. 1 displays data from a smart device, according to an illustrative embodiment.

In some embodiments, the system 100 may be communicably coupled to one or more external devices and configured to display data from the external devices. Referring now to FIG. 46, depicted is the kitchen environment 3600 including a smart device 4600. The smart device 4600 may be communicably coupled with the controller 102 such that data from the smart device 4600 may be displayed via the display 104 to the user. For example, the smart device 4600 may be paired with the controller 102 (e.g., via BLUETOOTH, via WI-FI, etc.). In some embodiments, the smart device 4600 may be a smart cutting board. The smart cutting board may include an internal digital scale among with various communication interfaces. The smart device 4600 may be configured to generate data (e.g., a weight of an object positioned on the smart cutting board as shown in FIG. 46), and transmit such data to the controller 102. The controller 102 may be configured to generate a control signal for the display 104 to display an image of the weight detected by the smart cutting board.

Figure 47:
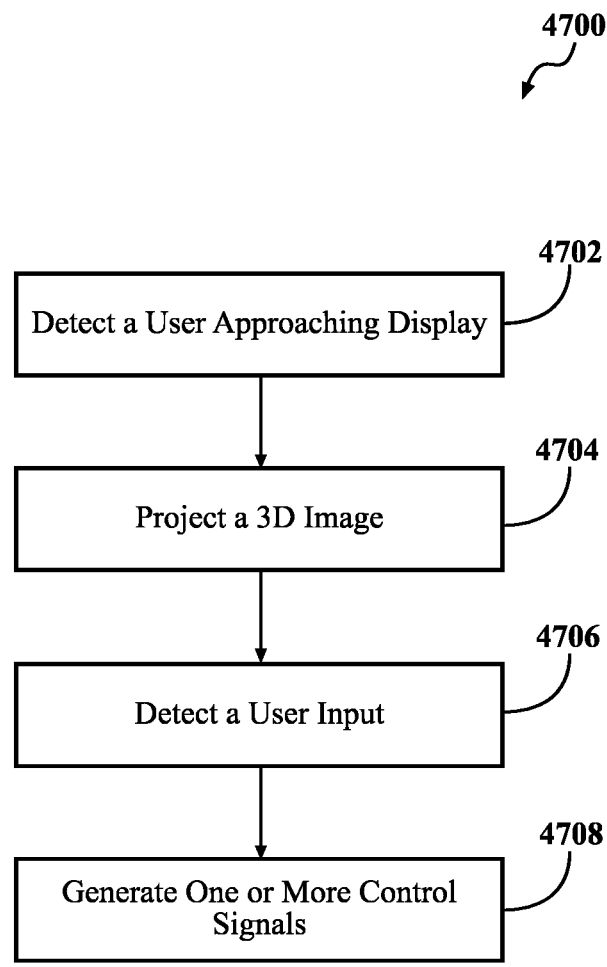
FIG. 47 shows a flowchart showing a method of controlling a device using a projected image, according to an illustrative embodiment.

Referring now to FIG. 47, depicted is a flowchart showing a method 4700 of controlling a device, such as a plumbing fixture, light, a smart mirror, a media source, etc., according to an illustrative embodiment. The method 4700 may be implemented by the components described above. As a brief overview, at step 4702, a controller 102 detects a user approaching a display 104. At step 4704, the controller 102 projects an image 202. At step 4706, the controller 102 detects a user input. At step 4708, the controller 102 generates one or more control signals.

At step 4702, a controller 102 detects a user approaching a display 104. In some embodiments, the controller 102 may detect a user approaching a display 104 based on data from a proximity sensor. The proximity sensor may be mounted in an environment corresponding to the display 104 (e.g., near a faucet or sink, within a smart mirror, near a toilet, in a ceiling within a room, etc.). In some embodiments, the proximity sensor may be an ultrasonic sensor, an infrared sensor, radar sensor, LIDAR sensor, etc. In some embodiments, the proximity sensor may be used to detect a user approaching a display 104 (or a location or environment corresponding to the display 104), and to detect user inputs to a projected image 202 from the display 104.

At step 4704, the controller 102 projects an image 202. In some embodiments, the controller 102 may project the image 202 from the display 104. The controller 102 may project the image 202 by generating one or more control signals for a light source 108 of the display 104. The light source 108 may be LEDs inside the display 104, an internal display screen (e.g., an LED, LCD, etc. display screen). The controller 102 may control the light source 108 to project light towards a lens 200. The light source 108 may project the light towards the lens 200 through a stencil 308. The light from the light source 108 projected towards the lens 200 may be reflected and refracted internally within the lens 200 to generate the image 202 external to the display 104 (e.g., in space).

At step 4706, the controller 102 detects a user input. In some embodiments, the controller 102 may detect the user input based on data received from sensors 106. The sensors 106 may be internal to the display 104, external to the display 104, etc. The sensors 106 may generate sensor data corresponding to a position of a user's hand, finger, etc. relative to the display 104. In some embodiments, the sensors 106 may be used both to generate data corresponding to user inputs (e.g., at step 4706) as well as to generate data corresponding to a presence of a user at the display 104 (e.g., at step 4702). The sensors 106 may provide the data to the controller 102 for detecting the user input. The user input may be selecting an image 202 of a button, moving their finger along an image 202 of a bar, etc. The controller 102 may receive the sensor data from the sensors 106. The controller 102 may parse the sensor data to detect, determine, or otherwise identify a user input. The controller 102 may determine the location of the user's hand or finger based on the sensor data. The controller 102 may cross-reference the determined location of the user's hand with data in memory for identifying a corresponding user input.

At step 4708, the controller 102 generates one or more control signals. In some embodiments, the controller 102 generates one or more valve control signals for a valve of a plumbing fixture (e.g., a faucet 1904, a toilet 2800, a bathtub 3500, a shower, etc.). The controller 102 may generate the valve control signal(s) based on the user input (e.g., detected at step 4706). The controller 102 may generate valve control signal(s) to open valve(s), close valve(s), modify a relative position of valve(s), etc. based on detected user inputs. For example, the user may push their finger into a projected image 202 and "press" the projected image 202 of an on/off symbol (e.g., to turn on a showerhead or a faucet). The controller 102 may generate valve control signal(s) to open valves for the plumbing fixture responsive to detecting the user input to the image 202 of the on/off symbol. Where the user "presses" the image 202 of the on/off symbol subsequently, the controller 102 may generate valve control signal(s) to close the valves of the plumbing fixture. Similarly, the controller 102 may generate light control signals for controlling light(s) in a room 3000, side lights 302 of a smart mirror 300, valves for a toilet 2800 or bathtub 3500, a media source as shown in FIG. 32 and FIG. 35, and so forth.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components (such as the controller 102) used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the systems as shown in the various exemplary embodiments is illustrative only. Additionally, any element disclosed in one embodiment may be incorporated or utilized with any other embodiment disclosed herein. For example, the components of the display in the embodiment shown in FIG. 14 may be incorporated in the exemplary embodiments shown in the smart mirror 300 of FIG. 3 to provide a more low-profile smart mirror 300. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A mirror assembly, comprising:
   an interior portion;
   a wall comprising an exterior reflective surface, at least a portion of the wall configured to allow light to pass from the interior portion through the wall; and
   a light source and a lens located within the interior portion;
   wherein the lens is arranged to receive light from the light source and to direct such light through the portion of the wall so as to project an image beyond the exterior reflective surface wherein the perspective of the projected image, relative to a user, is modifiable based on data received from one or more sensors.

2. The mirror assembly of claim 1, wherein the interior portion further comprises a plate supporting a stencil, wherein the plate is located between the light source and the lens such that the light source projects light through the stencil of the plate and toward the lens.

3. The mirror assembly of claim 2, wherein the stencil defines the projected image.

4. The mirror assembly of claim 1, wherein the light source comprises a display, and wherein the projected image is generated using the display, and wherein the projected image includes at least one of a notification, a current weather status, or a current time.

5. The mirror assembly of claim 1, further comprising:
   one or more external lights adjacent the reflective surface;
   at least one sensor; and
   a controller communicably coupled to the at least one sensor and the one or more external lights, wherein the controller is configured to:
   cause the light source to direct light toward the lens to project the image; detect user interaction with the image; and
   generate one or more control signals for controlling the one or more external lights based on the detected user interaction with the image.

6. The mirror assembly of claim 5, wherein the user interaction comprises a push through user input to the image, and wherein the one or more control signals are configured to activate or deactivate the one or more external lights based on the push through user input.

7. The mirror assembly of claim 5, wherein the user interaction comprises a swipe through user input to the image, and wherein the one or more control signals are configured to change a brightness of the one or more external lights based on the swipe through user input.

8. The mirror assembly of claim 7, wherein the one or more control signals change the brightness of the one or more external lights based on a direction of the swipe through user input to the image.

9. The mirror assembly of claim 5, further comprising a sensor bar comprising the at least one sensor, the sensor bar arranged along an underside of the mirror assembly adjacent the reflective surface.

10. The mirror assembly of claim 5, wherein the at least one sensor comprises an ultrasonic sensor.

11. The mirror assembly of claim 5, wherein the projected image comprises a hologram projected at a distance from the reflective surface.

12. A mirror assembly, comprising: an interior portion;
a wall comprising an exterior reflective surface, at least a portion of the wall configured to allow light to pass from the interior portion through the wall; and
a light source and a lens located within the interior portion, wherein the lens is arranged to receive light from the light source and to direct such light through the portion of the wall so as to project an image beyond the exterior reflective surface;
one or more external lights located along the wall adjacent the exterior reflective surface; and
a controller communicably coupled to the one or more external lights, wherein the controller is configured to generate one or more control signals for controlling the one or more external lights based on a user interaction with the projected image; and
the controller being further configured to modify the perspective of the projected image, relative to a user, based on data received from one or more sensors.

13. The mirror assembly of claim 12, wherein the interior portion further comprises a plate supporting a stencil, wherein the plate is located between the internal light source and the lens such that the light source projects light through the stencil of the plate and toward the lens.

14. The mirror assembly of claim 13, wherein the stencil defines the projected image.

15. The mirror assembly of claim 12, wherein the user interaction comprises a push through user input to the image, and wherein the one or more control signals are configured to activate or deactivate the one or more external lights based on the push through user input.

16. The mirror assembly of claim 12, wherein the user interaction comprises a swipe through user input to the image, and wherein the one or more control signals are configured to change a brightness of light from the one or more external lights based on the swipe through user input.

17. The mirror assembly of claim 16, wherein the one or more control signals change the brightness of the light from the one or more external lights based on a direction of the swipe through user input to the image.

18. The mirror assembly of claim 12, wherein the internal light source comprises a display, and wherein the projected image is generated using the display, and wherein the projected image includes at least one of a notification, a current weather status, or a current time.

19. The mirror assembly of claim 12, wherein the mirror further comprises at least one sensor configured to detect the user interaction with the projected image.

20. The mirror assembly of claim 12, wherein the projected image comprises a hologram projected at a distance from the reflective surface.

21. A system for controlling a fixture, the system comprising: a mirror assembly comprising:
an interior portion;
a wall comprising an exterior reflective surface, at least a portion of the wall configured to allow light to pass from the interior portion through the wall; and
a light source and a lens located within the interior portion, wherein the lens is arranged to receive light from the light source and to direct such light through the portion of the wall so as to project an image beyond the exterior reflective surface; and
one or more external lights located along the wall adjacent the exterior reflective surface;
a controller communicably coupled to the one or more external lights, wherein the controller is configured to generate one or more control signals for controlling the one or more external lights based on a user interaction with the projected image; and
the controller being further configured to modify the perspective of the projected image, relative to a user, based on data received from one or more sensors.

* * * * *